United States Patent
Babineau, Jr. et al.

(10) Patent No.: US 10,153,724 B2
(45) Date of Patent: Dec. 11, 2018

(54) METHODS AND DEVICES FOR COUPLING SOLAR PANEL SUPPORT STRUCTURES AND/OR SECURING SOLAR PANEL SUPPORT STRUCTURES TO A ROOF

(71) Applicant: JOHNS MANVILLE, Denver, CO (US)

(72) Inventors: Francis John Babineau, Jr., Parker, CO (US); Brian G Shamas, Golden, CO (US); Eric Smith, El Dorado Hills, CA (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 15/276,450

(22) Filed: Sep. 26, 2016

(65) Prior Publication Data

US 2017/0012574 A1 Jan. 12, 2017

Related U.S. Application Data

(62) Division of application No. 14/481,046, filed on Sep. 9, 2014, now Pat. No. 9,494,342.

(51) Int. Cl.
*H02S 20/24* (2014.01)
*H02S 20/23* (2014.01)
(Continued)

(52) U.S. Cl.
CPC .............. *H02S 20/24* (2014.12); *B29C 65/02* (2013.01); *B29C 65/50* (2013.01); *B29C 70/28* (2013.01); *B29C 70/44* (2013.01); *B29C 70/443* (2013.01); *F24S 25/11* (2018.05); *F24S 25/16* (2018.05); *F24S 25/634* (2018.05); *H02S 20/23* (2014.12); *H02S 40/34* (2014.12); *B29K 2105/08* (2013.01); *B29L 2031/10* (2013.01); *F24S 2025/021* (2018.05); *F24S 2025/601* (2018.05);
(Continued)

(58) Field of Classification Search
CPC ........ F24J 2/5203; F24J 2/5228; F24J 2/5256; F24J 2/5237; F24J 2/5239; H02S 20/24; Y02B 10/12; F24S 25/11; F24S 2025/601; F24S 2025/021
See application file for complete search history.

(56) References Cited

U.S. PATENT DOCUMENTS 8,485,483 B2 7/2013 Rees
8,601,755 B2 12/2013 Clarkson et al.
(Continued)

*Primary Examiner* — Adriana Figueroa
*Assistant Examiner* — Jessie T Fonseca
(74) *Attorney, Agent, or Firm* — Robert D. Touslee

(57) ABSTRACT

A mounting unit for mounting a solar panel on a roof includes a base having a first flange and a second flange that extend laterally from the base and a mounting surface positioned above the base via walls that connect the mounting surface and the base. The mounting surface is couplable with the solar panel to elevate and orient the solar panel above a surface of the roof. The mounting unit also includes a flexible membrane material that is coupled with the first flange of the base and that extends laterally therefrom. The mounting unit further includes an adhesive or tape that is applied to an underside of the second flange so that the second flange is free of the flexible membrane material. The flexible membrane material is couplable with the roof and the adhesive or tape is adherable to the roof to secure the mounting unit to the roof.

21 Claims, 24 Drawing Sheets

(51) Int. Cl.
*B29C 70/44* (2006.01)
*B29C 70/28* (2006.01)
*H02S 40/34* (2014.01)
*F24S 25/11* (2018.01)
*F24S 25/16* (2018.01)
*F24S 25/634* (2018.01)
*B29C 65/02* (2006.01)
*B29C 65/50* (2006.01)
*B29L 31/10* (2006.01)
*B29K 105/08* (2006.01)
*F24S 25/60* (2018.01)
*F24S 25/00* (2018.01)

(52) U.S. Cl.
CPC ............... *Y02B 10/12* (2013.01); *Y02B 10/20* (2013.01); *Y02B 10/22* (2013.01); *Y02E 10/47* (2013.01)

(56) References Cited

U.S. PATENT DOCUMENTS

| | | | |
|---|---|---|---|
| 8,850,754 | B2 | 10/2014 | Rizzo |
| 2007/0289232 | A1 | 12/2007 | Crostic |
| 2009/0211182 | A1 | 8/2009 | Proisy |
| 2010/0043781 | A1 | 2/2010 | Jones et al. |
| 2010/0143711 | A1 | 6/2010 | Daigaku et al. |
| 2011/0108083 | A1 | 5/2011 | Ravestein et al. |
| 2012/0036799 | A1 | 2/2012 | Kneip et al. |
| 2012/0199180 | A1 | 8/2012 | Salam |
| 2013/0111830 | A1* | 5/2013 | Aseere .......... F24J 2/5205 52/173.3 |
| 2013/0112248 | A1 | 5/2013 | McPheeters |
| 2013/0133275 | A1 | 5/2013 | Bindschedler et al. |
| 2013/0298968 | A1 | 11/2013 | Laitila et al. |
| 2014/0283897 | A1 | 9/2014 | Chen et al. |

\* cited by examiner

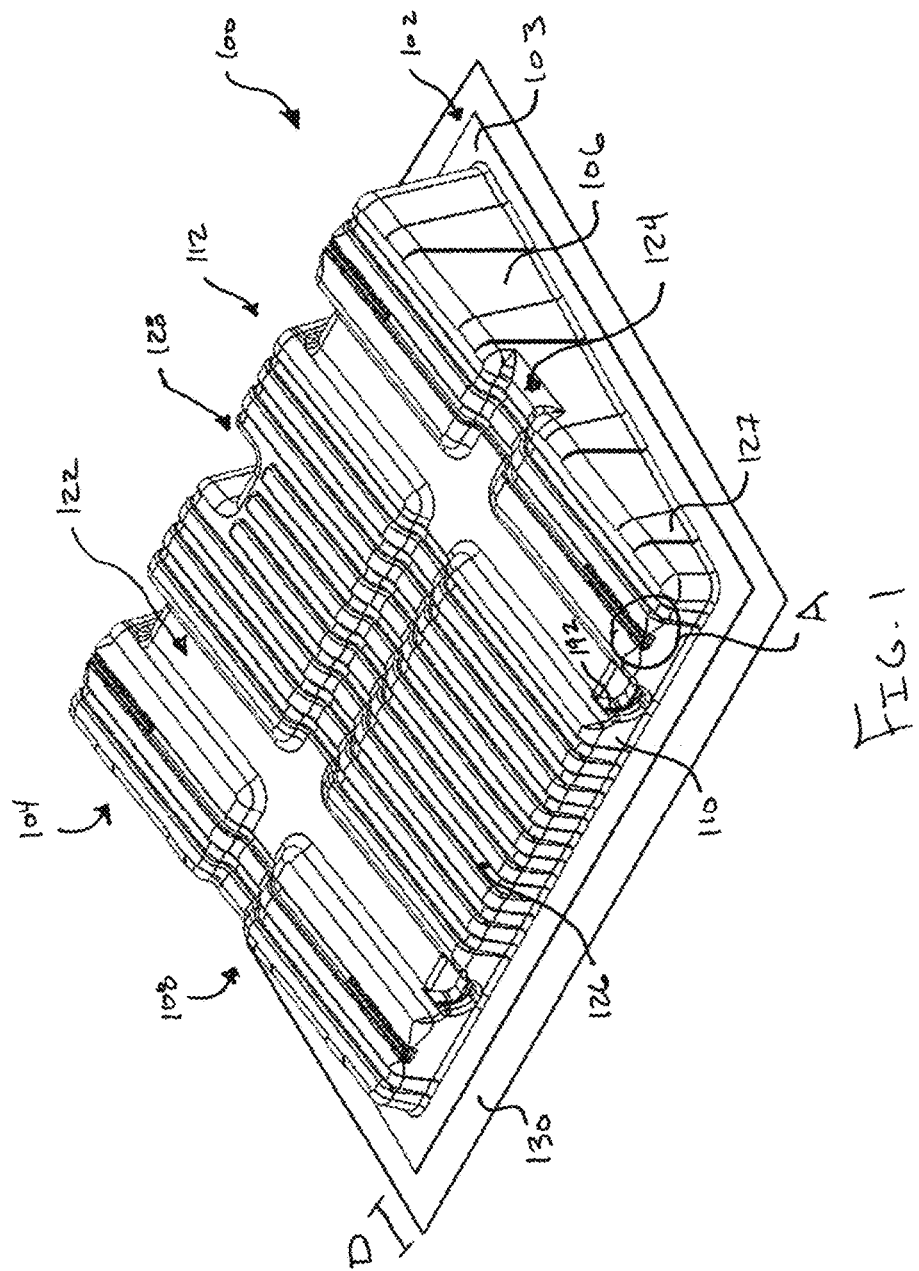

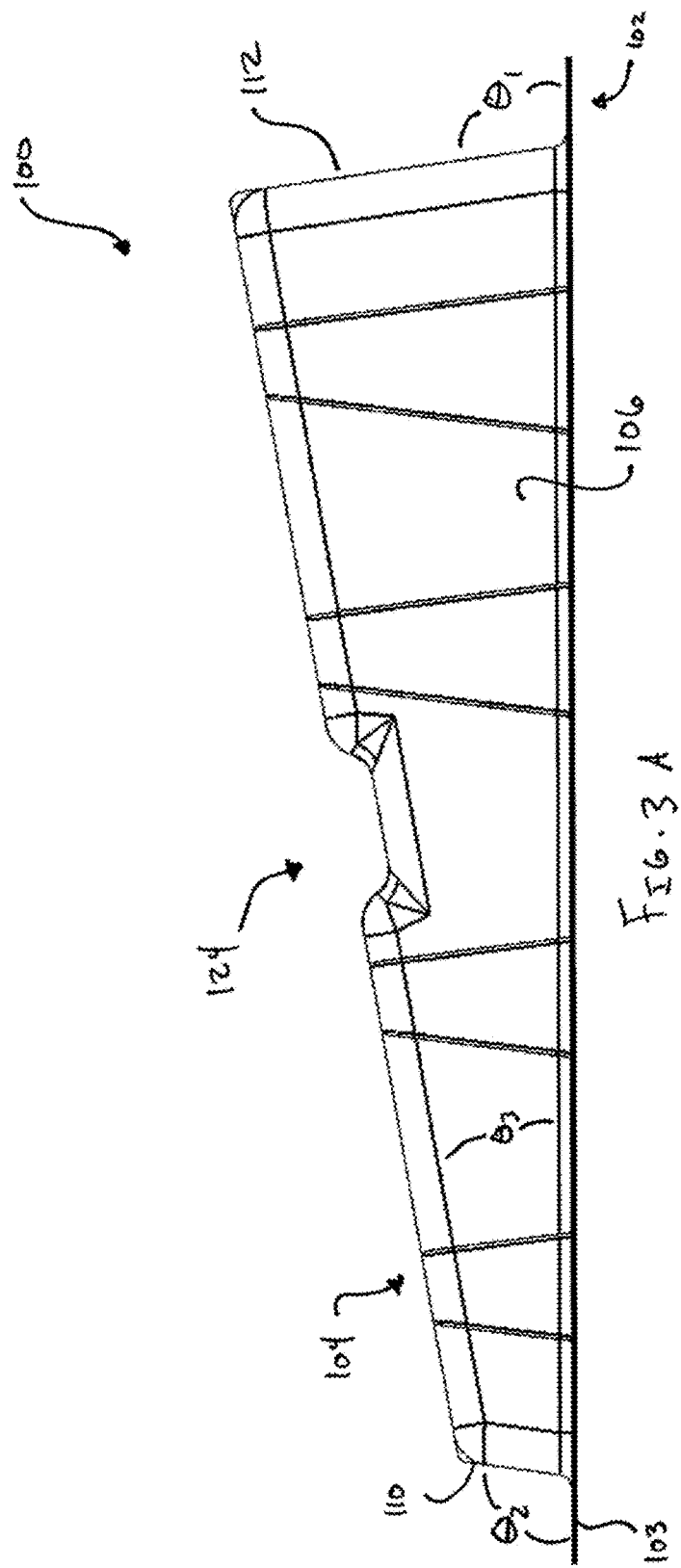

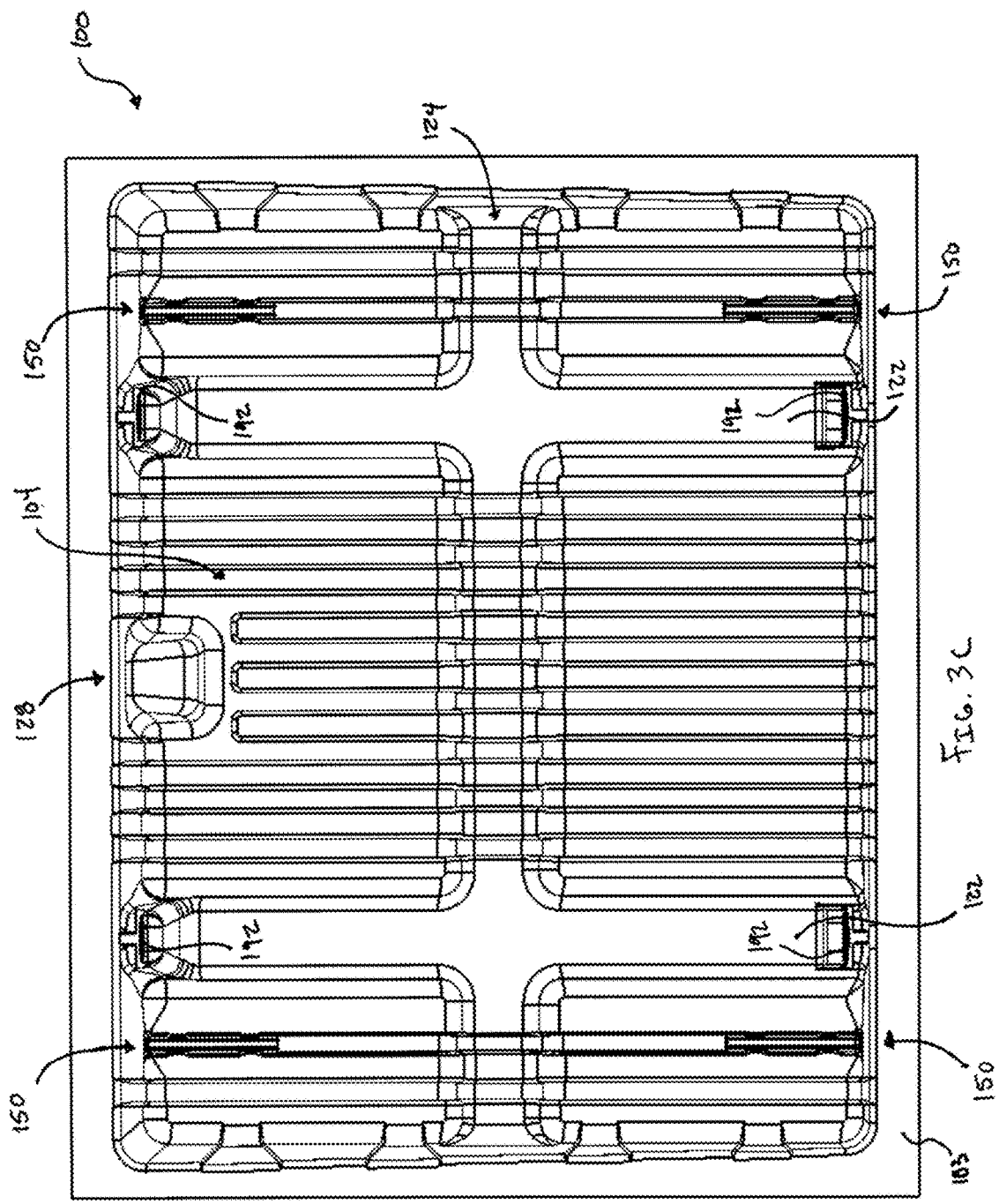

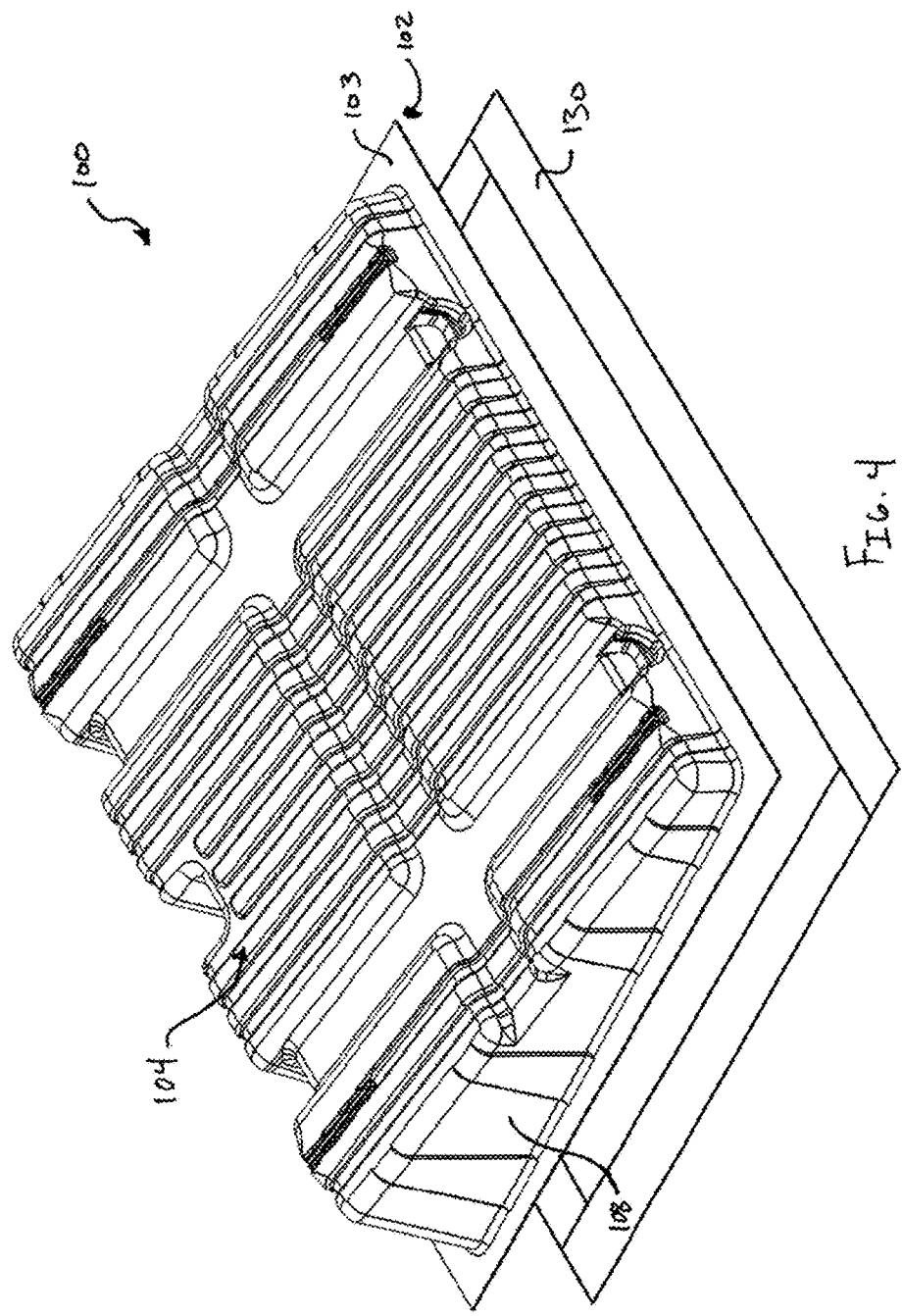

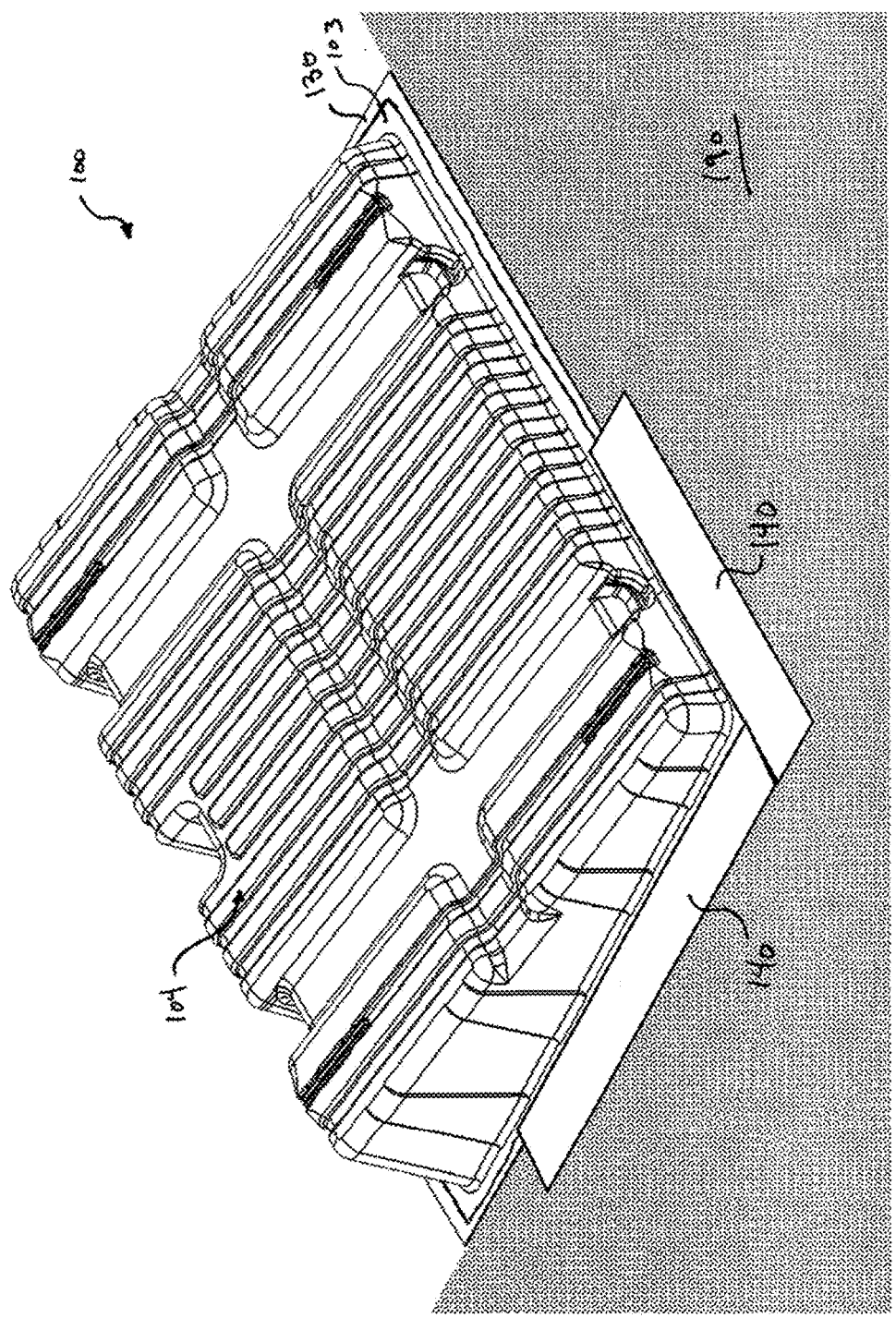

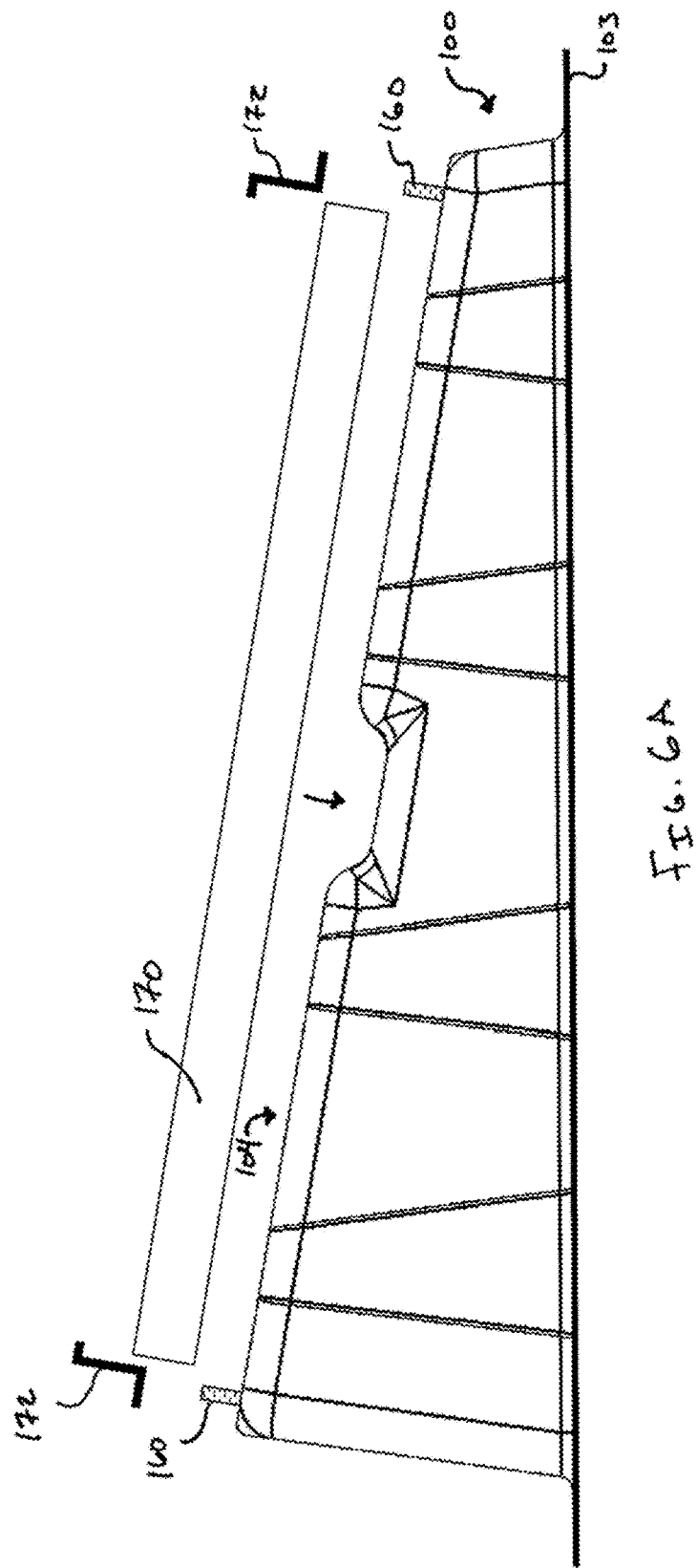

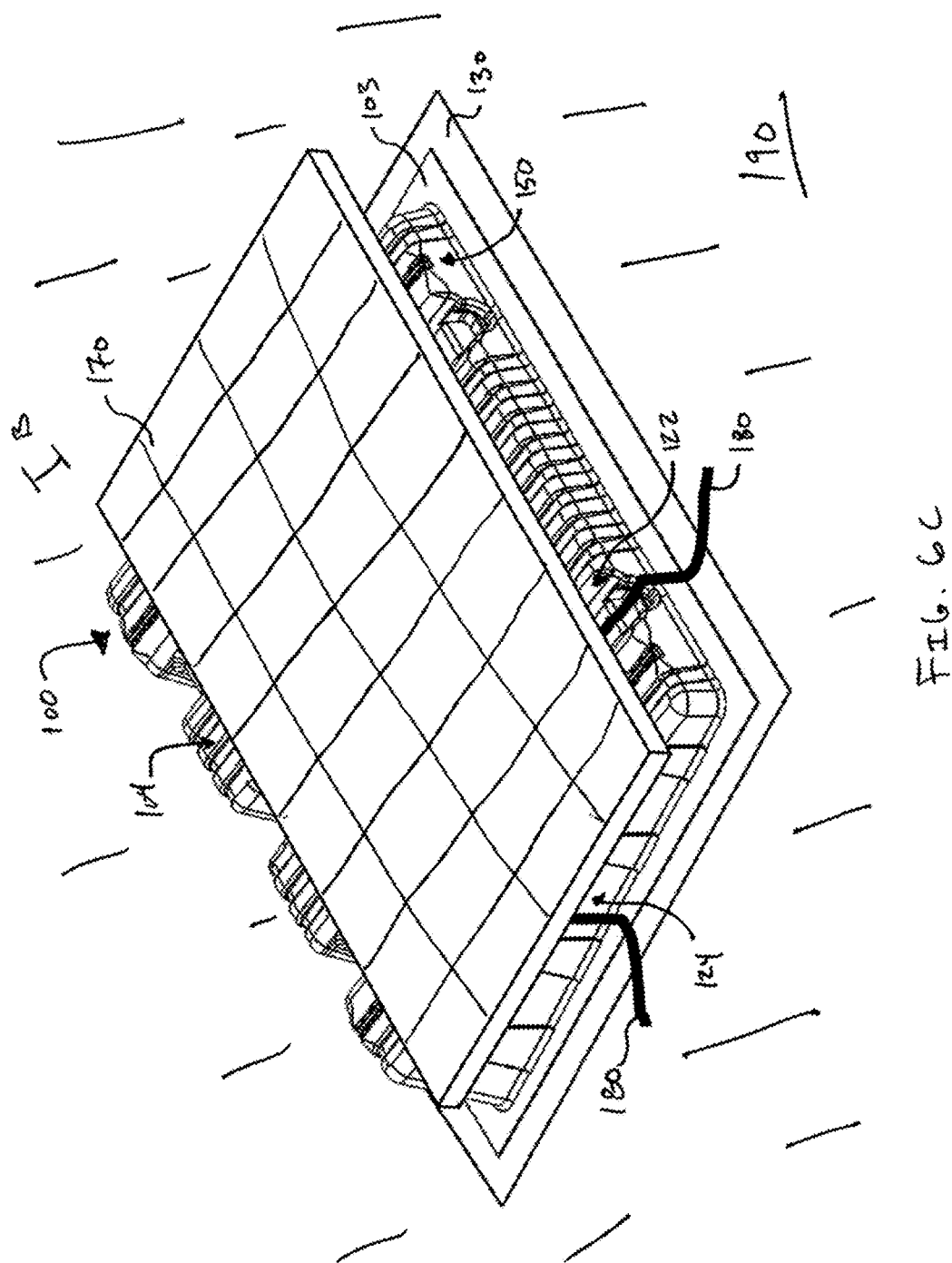

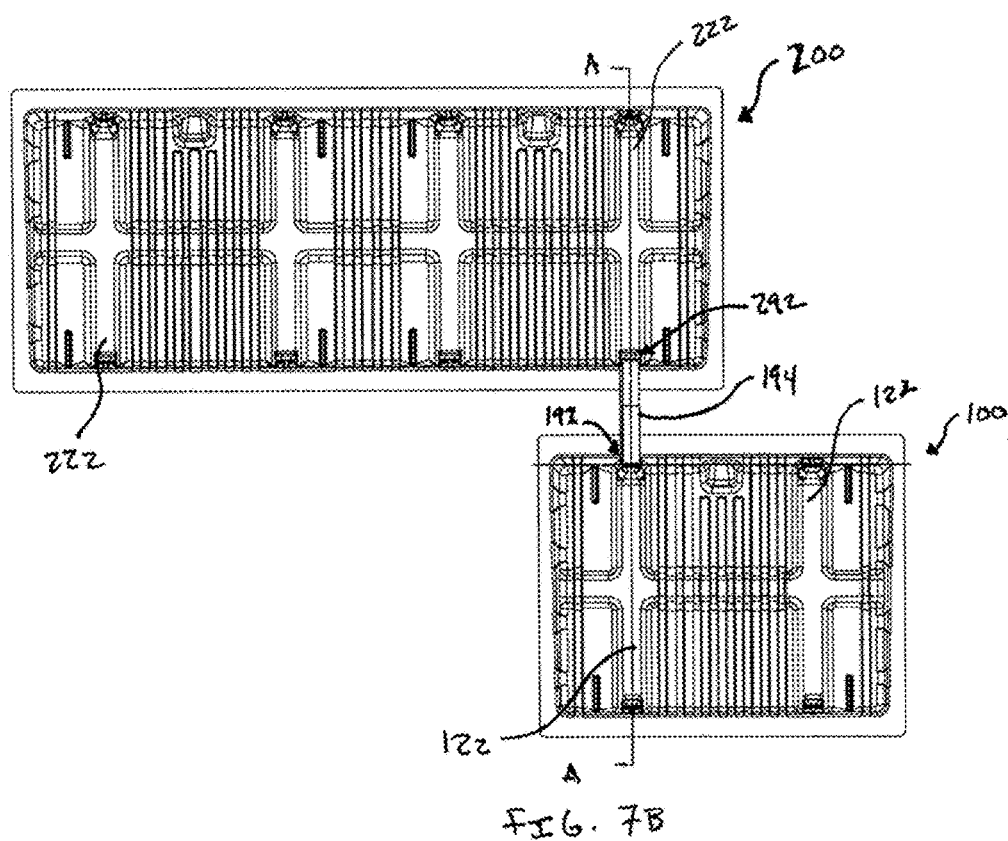
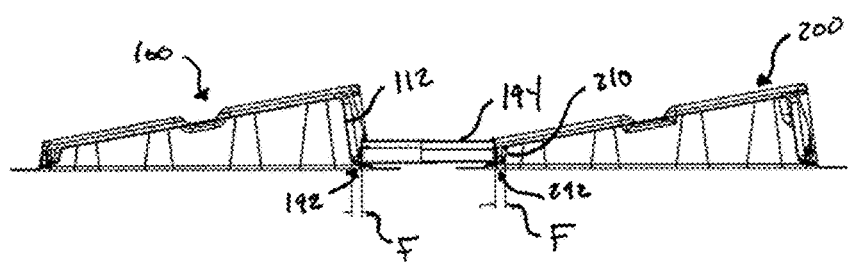

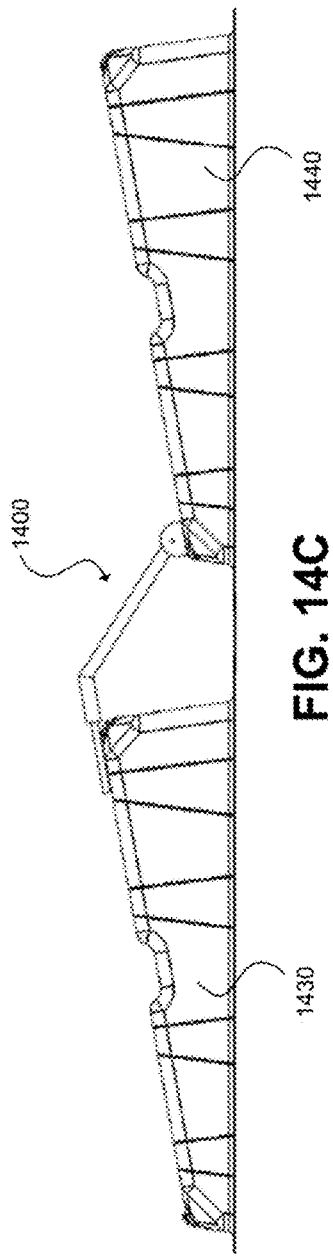
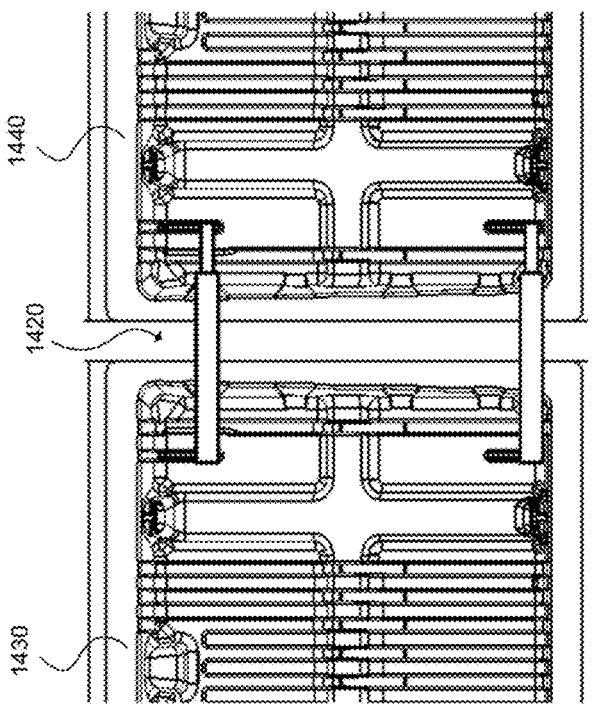
FIG. 14C
FIG. 14D

METHODS AND DEVICES FOR COUPLING SOLAR PANEL SUPPORT STRUCTURES AND/OR SECURING SOLAR PANEL SUPPORT STRUCTURES TO A ROOF

CROSS-REFERENCES TO RELATED APPLICATIONS

This application is a division of prior pending U.S. application Ser. No. 14/481,046 filed Sep. 9, 2014. The entire contents of the above-identified application is herein incorporated by reference for all purposes.

BACKGROUND OF THE INVENTION

Solar or photovoltaic panels or modules are often positioned on the roof of a structure or building to generate electricity in order to operate various equipment, machinery, lighting or other fixtures, and the like. The solar panels are often held in place atop the roof by mounting the solar panel to a frame and attaching the frame to the roof. Common methods of attaching the frame to the roof include using pole mounts that are directly attached to the roof deck via one or more mechanical fasteners (e.g., bolts, screws, and the like) that penetrate through a portion or the entirety of the roof's structure. The penetrations through the roof present a potential failure point where future water leakage or other problems may occur. Additional time and cost is also required to seal such penetrations to minimize or eliminate such leakage or other problems. Pole mounts also limit the ability of the solar panel to be easily moved or removed from a roof.

Alternatively, another common method that may not require roof penetrations includes using ballasted footing mounts, such as concrete blocks, steel bases, paver stones, rocks, and the like. Such ballasted footing mounts use heavy weight to secure the solar panel and frame to the roof. The heavy ballasted footing mounts produce concentrated or point loads on the roof structure at the point where the ballasted footing mounts contact the roof's surface. Because roofs are often designed to only support a specified load, which normally includes snow and/or other load types, it is critical not to exceed the structural limitations of the roof. Heavy concentrated or point loads may place undue and/or unsafe stress on the roof at the point of contact and/or may damage components of the roof system even when the heavy point loads do not otherwise present a structural risk. Further, the concentrated or point load may also crush or compress insulation thereby reducing R value and/or stressing the roof membrane.

The use and/or desire for solar panels on roofs appear to be increasing as individuals and companies find ways to be more environmentally conscious. As such, there is a constant need for improved methods and systems for securing solar panels to roofs in such a manner as to not degrade the performance or useful service life of the roof.

BRIEF SUMMARY OF THE INVENTION

Embodiments of the invention provide methods, devices, and systems related to mounting units for mounting solar panels to a roof of a building or structure. In one aspect, embodiments of the invention provide a mounting unit for mounting a solar panel on a roof. The mounting unit includes a base that is configured for positioning adjacent the roof. The base includes a first flange and a second flange that extend laterally from the base. The mounting unit also includes a mounting surface that is positioned above the base via walls that connect the mounting surface and the base. The mounting surface is couplable with the solar panel to elevate the solar panel above a surface of the roof and to orient the solar panel at an angle relative to the roof. The mounting unit further includes a flexible membrane material that is coupled with the first flange of the base and that extends laterally therefrom. An adhesive or tape is applied to an underside of the second flange so that the second flange is free of the flexible membrane material. The flexible membrane material is couplable with the roof and the adhesive or tape is adherable to the roof to secure the mounting unit to the roof.

According to another aspect, embodiments of the invention provide a method of attaching a solar panel mounting unit to a roof. The method includes providing a solar panel mounting unit having: a base that includes a first flange and a second flange that extend laterally from the base; a mounting surface positioned above the base via walls that connect the mounting surface and the base; a flexible membrane coupled with the first flange of the base and extending laterally therefrom; and an adhesive or tape applied to an underside of the second flange so that the second flange is free of the flexible membrane material. The method also includes coupling the flexible membrane material with the roof to secure the solar panel mounting unit to the roof and adhesively bonding the adhesive or tape with the roof to additionally secure the mounting unit to the roof.

In some embodiments, the method further includes aligning a plurality of mounting units atop a roof by: coupling a flexible membrane material of a first mounting unit with the roof; positioning a front flange of a second mounting unit atop the flexible membrane of the first mounting unit; and adhesively bonding, via the adhesive or tape, the front flange of the second mounting unit with the flexible membrane of the first mounting unit.

In some embodiments, the method may further include laterally spacing a plurality of mounting units atop the roof by providing a spacing jig that includes: a first longitudinal section; a first flange member that extends from a proximal end of the first longitudinal section; a second longitudinal section telescopingly disposed within the first longitudinal section; and a second flange member that extends from a distal end of the second longitudinal section. In such embodiments, the method may include positioning a first mounting unit atop the roof, positioning a second mounting unit atop the roof, positioning the first flange member of the spacing jig within a slot of the mounting surface of the first mounting unit, and positioning the second flange member of the spacing jig within a slot of the mounting surface of the second mounting unit. Said positioning of said first and second flange members within said respective slots spaces said first and second mounting units.

In some embodiments, the method may further include longitudinally spacing a plurality of mounting units atop the roof by providing a spacing jig that includes: a first longitudinal section; a first flange member that is pivotally attached to a proximal end of the first longitudinal section; a second longitudinal section coupled with the first longitudinal section so as to have an angled orientation relative thereto; and a second flange member that extends from a distal end of the second longitudinal section. In such embodiments, the method may include positioning a first mounting unit atop the roof; positioning a second mounting unit atop the roof; positioning the first flange member of the spacing jig within a slot of the mounting surface of the first mounting unit; and positioning the second flange member of the spacing jig within a slot of the mounting surface of the second mounting unit. Said positioning of said first and second flange members within said respective slots spaces said first and second mounting units.

According to another aspect, embodiments of the invention provide a mounting unit for mounting a solar panel on a roof. The mounting unit includes: a base; a plurality of wall that extend upward from the base; and a mounting surface connected with and positioned above the base via the plurality of walls. The mounting surface includes a plurality of slots that are each configured to receive a coupling component that facilitates in coupling the solar panel atop the mounting surface. At least one slot, and in some embodiments each slot, is reinforced to secure the solar panel atop the mounting unit and thereby increase the wind uplift resistance of the mounting unit.

According to another aspect, embodiments of the invention provide a method of reinforcing a solar panel mounting unit. The method includes providing a solar panel mounting unit having: a base; a plurality of wall that extend upward from the base; a mounting surface connected with and positioned above the base via the plurality of walls; and a plurality of slots that are formed in the mounting surface and configured to receive a coupling component that facilitates in coupling the solar panel atop the mounting surface. The method also includes reinforcing the plurality of slots so that at least one slot, and in some embodiments each slot, exhibits an increased ability to secure the solar panel atop the mounting unit, said reinforcement increasing the wind uplift resistance of the mounting unit.

According to another aspect, embodiments of the invention provide an electrically conductive clamp for a solar panel mounting unit. The electrically conductive clamp includes a clamp body having an elongate mid-section, a first end, and a second end opposite the first end, with the clamp body being made of an electrically conductive material. The first end is configured to couple with a metallic mounting rail of the mounting unit so that the first end contacts exposed metal of the mounting rail to establish electrical bonding between the clamp body and the mounting rail. The second end is configured to couple with a solar panel positioned atop the mounting unit so that the second end electrically contacts the solar panel and thereby establishes electrical bonding between the mounting rail and the solar panel.

According to another aspect, embodiments of the invention provide a method of electrically coupling a solar panel with one or more components of a solar panel mounting unit. The method includes providing a solar panel and providing a mounting unit. The mounting unit includes a metallic mounting rail that is configured for coupling with the solar panel. The method also includes positioning the solar panel atop the mounting unit and providing a clamp having an elongate mid-section, a first end, and a second end opposite the first end, where the clamp is made of an electrically conductive material. The method further includes coupling the first end of the clamp with the metallic mounting rail of the mounting unit so that the first end contacts exposed metal of the mounting rail to establish electrical bonding between the clamp and the mounting rail, and coupling the second end of the clamp with the solar panel positioned atop the mounting unit so that the second end electrically contacts the solar panel and thereby establishes electrical bonding between the mounting rail and the solar panel.

BRIEF DESCRIPTION OF THE DRAWINGS

Embodiments of the present invention are described in conjunction with the appended figures:

FIG. 1 illustrates a perspective view of a mounting unit according to an embodiment of the invention.

FIGS. 3A-3C illustrate a side view, front view, and top view of the mounting unit of FIG. 1 according to an embodiment of the invention.

FIG. 4 illustrates a perspective exploded view of a mounting unit and flexible membrane according to an embodiment of the invention.

FIG. 5 illustrates a perspective view of the mounting unit of FIG. 4 attached to a roof's surface according to an embodiment of the invention.

FIGS. 6A and 6B illustrate side views of a solar panel being mounted atop a mounting unit according to an embodiment of the invention.

FIG. 6C illustrates a perspective view of the mounting unit of FIGS. 6A and 6B having the solar panel mounted atop a mounting surface of the mounting unit and the mounting unit attached to a roof's surface according to an embodiment of the invention.

FIG. 7A-7C illustrate various views of a conduit that may be used to connect channels of adjacent mounting units according to an embodiment of the invention.

FIGS. 14A-D illustrate spacing members that may be used to space mounting units atop a roof according to an embodiment of the invention.

Figure 1A:
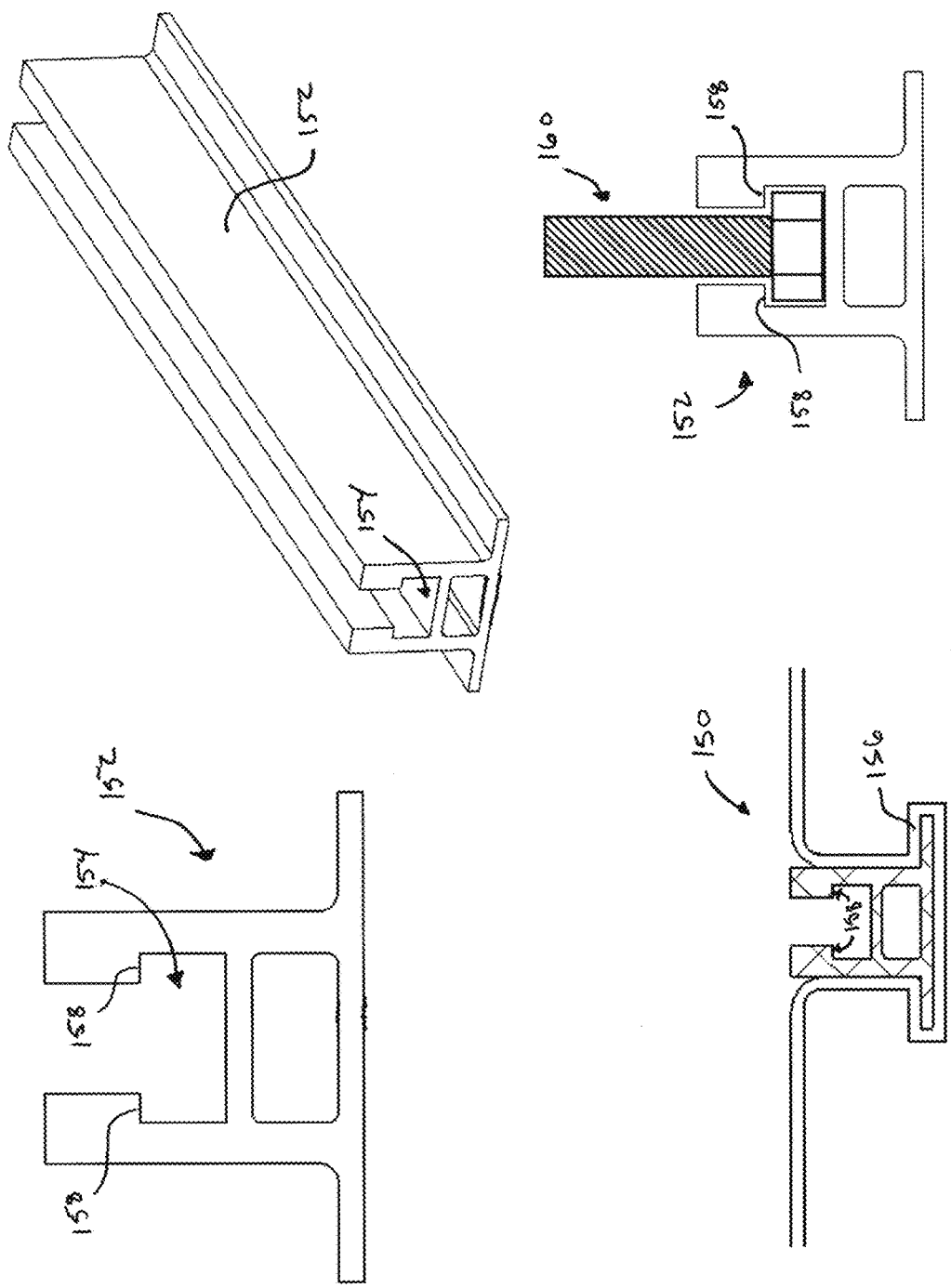
FIG. 1A illustrates an embodiment of an insert that may be used with the mounting unit of FIG. 1.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the embodiments will provide those skilled in the art with an enabling description for implementing one or more embodiments. It being understood that various changes may be made in the function and arrangement of elements without departing from the spirit and scope of the invention as set forth in the appended claims. Specific details are given in the following description to provide a thorough understanding of the embodiments. However, it will be understood by one of ordinary skill in the art that the embodiments may be practiced without these specific details. Also, it is noted that methods or processes may be depicted as a flowchart or a block diagram. Although a flowchart may describe the operations as a sequential process, many of the operations can be performed in parallel or concurrently. In addition, the order of the operations may be re-arranged. Further a process could have additional steps not discussed or included in a figure. Furthermore, not all operations in any particularly described process may occur in all embodiments.

As used herein, the term solar panel (also referred to herein as photovoltaic panels or modules) includes any panel or array of solar or photovoltaic cells. Such panels are used to generate and supply electricity, typically in residential and commercial applications. For example, solar panels are often installed on the roofs of homes and buildings to generate and supply electricity to the home or building to operate various machinery, equipment, components, lighting and/or other fixtures, and the like. Many buildings and/or homes often include several solar panels arranged in a grid or array that form a photovoltaic system. The solar panels may be electrically coupled to increase the power generated and provided to the home or building.

The application references several angles measured relative or with respect to the base. It should be understood that "relative or with respect to" the base refers to a surface upon which the base rests, which may be the surface of a roof or other structure. In many embodiments this surface is substantially equivalent to or roughly parallel with the surface of the mounting unit's flange. Thus, it should be realized that any specified angle may also, or may alternatively, be measured relative or with respect to a surface of the mounting unit's flange.

Embodiments of the invention provide methods and systems for mounting a solar panel or photovoltaic module to a roof a structure, such as a home or building. A mounting unit or device may be used to mount the solar panel to the roof. The mounting unit may be a single hollow component comprising various ribs, radiuses, draft angles, thin walls, and/or integrated mounting hardware to provide a rigid yet lightweight structure. In other embodiments, the mounting unit may include multiple components or pieces that couple or butt together. The mounting unit may include a base that may define a lower periphery of the mounting unit. The base may include a flange that extends laterally from the mounting unit and extends partially or fully around the lower periphery of the mounting unit. The flange may extend out from the mounting unit to between about 0.5 inches and about 6 inches, and more commonly between about 2 and about 4 inches. The base's flange may facilitate in distributing the weight of the mounting unit and solar panel, preferably evenly or uniformly, across a relatively large surface area of the roof, thereby minimizing or eliminating concentrated or point loads. The base and flange may be positioned adjacent the roof's surface. The mounting unit may be made from a reinforced or un-reinforced plastic, such as polyethylene, polypropylene, styrene, polyvinyl chloride, and the like and may be made in one or more pieces or components via vacuum forming, injection molding, and the like. The total weight of the mounting unit may be between about 10 and about 17 pounds, and more commonly about 12 pounds. In some embodiments, the mounting unit distributes a load (e.g., the weight of the mounting unit, attached solar panel, and any other components) on the roof of less than about 1.0 $lb/in^2$ and more commonly less than about 0.5 $lb/in^2$. In a specific embodiment, the applied load of the mounting unit and solar panel directly on the roof below the mounting unit's flange is about 0.3 $lb/in^2$ or less.

The mounting unit may also include a mounting surface that is connected with the base via a plurality of walls. The mounting surface may be elevated above the base and oriented at an angle relative to the base so as to elevate an attached solar panel above the roof's surface and direct the solar panel toward sunlight incident on the roof's surface. The mounting surface and/or walls may include ribs that provide rigidity to the mounting unit structure. The ribs may define channels that allow air to access the underside of the solar panel to cool the solar panel and enhance electricity generation or production. The air flowing through the channels underneath the solar panel may also equalize wind pressure and thereby minimize wind loads placed on the solar panel and/or mounting unit. The walls of the mounting unit may be angled with respect to the base unit to minimize uplift and/or lateral wind loads and/or allow individual mounting units to be stacked atop one another to optimize storage and/or transport.

The mounting surface may also include one or more main channels that are sized larger than the channels defined by the ribs and that are configured to receive and/or route one or more electrical wires and/or power cables that couple with the solar panel. The mounting unit may include one or more longitudinally extending main channels and one or more transversely extending main channels. The main channels may also allow wind pressure equalization and natural convection cooling to occur as described herein. A structure's roof may include additional mounting units and solar panels arranged in a grid or array and the main channels may allow adjacent solar panels to be electrically coupled. Electrically coupling adjacent solar panels may include routing electrical wires or cables through a telescoping conduit that releasably couples with adjacent mounting units. The mounting surface may also include a ground channel that allows an electrical ground to be connected with the solar panel.

The mounting surface may also include one or more mounting features that allow the mounting unit to releasably couple with the solar panel. The mounting features may include mounting channels that are shaped to receive an insert that couples with a fastener or fasteners to secure the solar panel to the mounting surface of the mounting unit. The insert and/or mounting channels can comprise an inverted T shape, or other shape, that allows the insert and/or channel to slidingly receive the fasteners, such as a bolt and the like, and that prevents or restricts removal of the fasteners in a direction roughly normal or orthogonal to the mounting surface. The fasteners (e.g., bolt and the like) may extend roughly normal or orthogonal from the mounting surface and may be inserted through an aperture of a mounting component (e.g., a mounting plate having a Z profile) of the solar panel and secured with respect thereto. In some embodiments, the insert may be integrated into the mounting surface, such as by molding the insert into the mounting surface. The integrated insert may provide a more secure attachment between the solar panel and the mounting unit.

The mounting unit may further include a flexible membrane that couples with the base, such as the flange. The flexible membrane (also referred to herein as a skirt or flexible skirt) may be made of common roofing membrane materials such as: Thermo Plastic Olefin (TPO), Ethylene Propylene Diene Monomer (EPDM), Polyvinyl Chloride (PVC), thermoplastic vulcanizates (TPV), and/or the other roofing membrane materials described herein. In one embodiment, the flexible membrane includes a TPO material with a polyester fleece attached to the bottom surface. The polyester fleece may enable the mounting unit to be adhesively bonded to an asphaltic or bituminous roof membrane by absorbing liquid adhesives that bond the skirt to the textured roof surface. The fleece may be thermally embedded in the bottom of the TPO membrane and provide a good bonding surface for adhesives to adhere the mounting unit to a bituminous, asphaltic, or other roof surface. The flexible membrane may be bonded to an underside of the flange and may extend laterally beyond the flange. In some embodiments, the flexible membrane extends beyond the flange by between about 1 inch and about 5 inches, and more commonly by about 2 inches. The flexible membrane may be coupled with a membrane material of the roof, which may include: Thermo Plastic Olefin (TPO), Ethylene Propylene Diene Monomer (EPDM), Polyvinyl Chloride (PVC), thermoplastic vulcanizates (TPV), and the like. The flexible membrane may be coupled with the flange and/or roof membrane via an adhesive, tape, heat welding, mechanical fasteners, and the like. The flexible membrane may be a large single piece or strip of material or several individual strips or segments of material. If a large single membrane is used for the membrane, an inner portion of the membrane may be removed to allow individual mounting units to be stacked atop one another for transport and/or storage.

The flexible membrane may allow the mounting unit to easily couple with various types of roof surfaces. The membrane material used may be selected based on the roofing material the membrane will couple with. The membrane may also function as a protective layer between the flange or base and the roof surface, such as by preventing or limiting relative motion between the flange and the roof surface that otherwise could result in roof penetrations and possible leakage. The membrane or skirt may be made of a flexible or compliant material to compensate for small variations in the roof's surface, thereby functioning to ensure a firm and continuous bond between the mounting unit and the roof's surface. For example, the flexible membrane may conform to and bond with uneven and/or rough surfaces of the roof and thereby form a continuous bond with roof's surface. The membrane may further function to allow the mounting unit and solar panel to be easily removed from the roof's surface. For example, the membrane may be removed (e.g., cut) from the roof or mounting unit so that the mounting unit and attached solar panel may be uncoupled from the roof. The mounting unit may then be fitted with another membrane and the mounting unit and/or solar panel reattached to the roof or attached to a different roof.

Wind uplift and/or loads may be further minimized by sealing the mounting unit to the roof and angling the rear wall with respect to the base. This may facilitate in directing winds, such as northerly winds, up and over the mounting unit and/or solar panel. When coupled with a solar panel, the mounting surface may extend beyond the solar panel by between about 1 and 10 inches and more commonly about 2 inches. This may limit the amount of wind that can get under the solar panel and generate additional wind loads.

While embodiments of the invention have been generally described, additional features will be evident with reference to the figures.

Mounting Unit Embodiments

Referring now to FIGS. 1 and 3A-6C, shown are various views of a mounting unit 100 configured to couple with a solar panel 170 in order to mount the solar panel to a roof (e.g., 190 of FIGS. 5 and 6B) of a structure, such as a home or building. Mounting unit 100 includes a base 102 that defines a lower periphery of mounting unit 100. Base 102 includes a flange 103 that laterally extends from mounting unit 100. Flange 103 may be a single structure that extends around the entire lower periphery of mounting unit 100, or, in some embodiments, flange 103 may only extend partially around mounting unit 100 and may include several flanges members or components. As shown in FIG. 1, flange 103 extends laterally about 2 to 4 inches from the mounting unit 100 around the entire lower periphery. In other embodiments, flange 103 may laterally extend more or less than this amount from mounting unit 100 (e.g., between about 0.5 and about 6 inches). Flange 103 may distribute, preferably evenly or uniformly, a load (e.g., the weight) of the mounting unit 100 and attached solar panel 170 across an area of roof 190. Flange 103 may also provide a relatively flat surface to which a flexible membrane 130 or other material may attach. One advantage of using flange 103 is that the mounting unit 100 and solar panel 170 load is distributed across an area the roof's surface, thereby minimizing concentrated or point loads. In some embodiments, however, base 102 may not include a flange and may instead include an edge, one or more contact points or components (e.g., feet), a plurality of elongate support members, and the like.

Figure 3B:
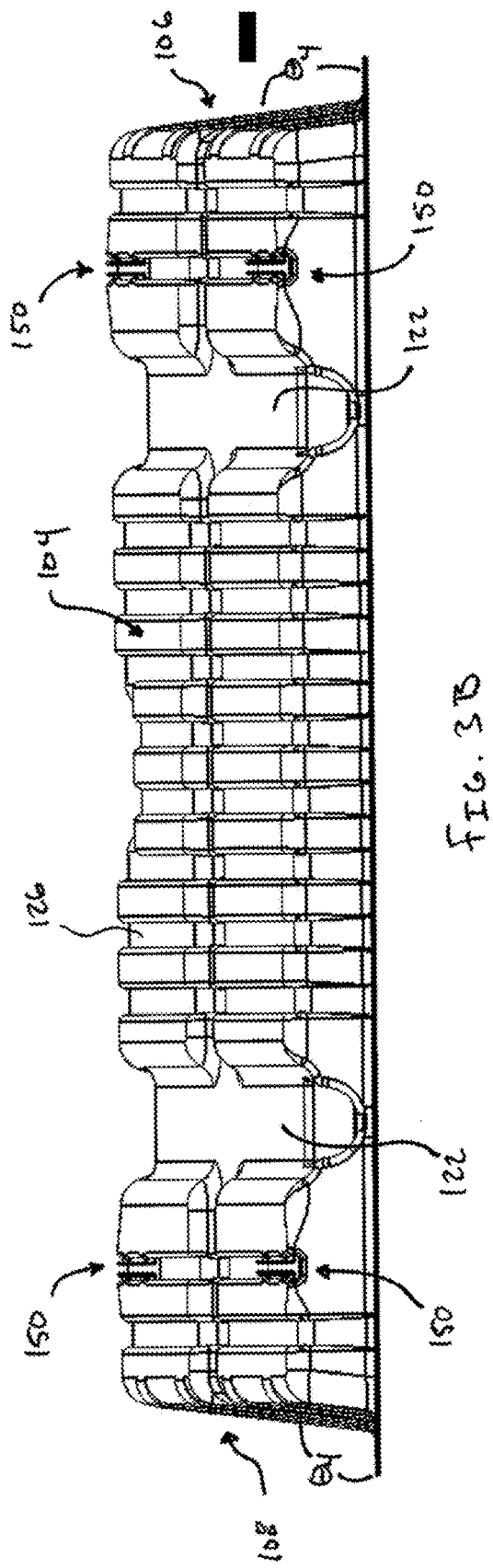

Flange 103 is connected to a plurality of walls around the periphery of mounting unit 100. Specifically, flange 103 connects with a front wall 110, a rear wall 112, and left and right walls, 108 and 106, respectively. As shown in FIG. 3A, rear wall 112 may be oriented at an angle, $\theta_1$, with respect to base 102 or flange 103 so as to minimize uplift and/or wind loads exerted on mounting unit 100 and the attached solar panel 170 by directing air up and over mounting unit 100 and/or attached solar panel 170. In some embodiments, $\theta_1$ may be angled between about 95 degrees and about 135 degrees, and more commonly about 100 degrees, with respect to base 102 or flange 103. Front surface 110 may similarly be oriented at an angle, $\theta_2$, with respect to base 102 or flange 103 to minimize uplift and/or wind loads. $\theta_2$ may be between about 90 degrees and about 135 degrees, and more commonly about 95 degrees, with respect to base 102 or flange 103. As shown in FIG. 3B, right wall 106 and left wall 108 may similarly be oriented at an angle, $\theta_4$, with respect to base 102 or flange 103 to likewise minimize uplift and/or wind loads. $\theta_4$ may be between about 90 degrees and about 135 degrees, and more commonly about 94 degrees, with respect to base 102 or flange 103.

Mounting unit 100 also includes a top structure or mounting surface 104 connected with walls, 106, 108, 110, and 112. Mounting surface 104 is elevated above base 102 so that the attached solar panel 170 is elevated above the roof's surface 190. As shown in FIG. 3A, mounting surface 104 may be oriented at an angle $\theta_3$ with respect to base 102 or flange 103. In some embodiments, $\theta_3$ may be between about 0 degrees and about 30 degrees, and more commonly about 10 to 15 degrees, with respect to base 102 or flange 103. $\theta_3$ may be angled such that the attached solar panel 170 is directed or angled toward sunlight incident on the roof's surface 190, thereby increasing energy production or generation. $\theta_3$ may also be useful for promoting drainage and/or self-cleaning via rain runoff of mounting unit 100 and solar panel 170. This design (i.e., $\theta_3$ angled to some degree) may be especially useful in application involving substantially flat or low slope roofs (e.g., 3-in-12 pitch or less), such as those commonly used in many commercial buildings. In other embodiments, $\theta_3$ may be minimal so that mounting surface 104 is substantially parallel with base 102 or flange 103. This design may be useful in high slope roofs, such as those commonly used for homes or other buildings.

Mounting unit 100 illustrated in FIGS. 1 and 3A-6C comprises a single hollow device. The use of a single hollow component for mounting unit 100 may provide rigidity and added structure to the mounting unit 100. Further, the hollow interior of mounting unit 100 may allow individual units to be stacked for compact storage and/or transport. In other embodiments mounting unit 100 may include multiple pieces or components that couple together and/or may include various openings or open regions. For example, walls 106, 108, 110, and 112, and/or mounting surface 104 may be a frame having various longitudinally and transversely extending elements or members that define the walls and mounting surface. Mounting unit 100 may be made from a reinforced or un-reinforced plastic, such as polyethylene, polypropylene, styrene, polyvinyl chloride, and the like and may be formed via a vacuum forming process, injection molding process, and the like. In one embodiment, the weight of the mounting unit may be between about 10 and about 17 pounds, and more commonly about 12 pounds. Mounting unit 100 includes various ribs 126, radiuses, draft angles, thin walls, and/or mounting hardware (e.g., mounting channel 150) that provide a rigid yet lightweight structure. In some embodiments, mounting unit 100 may have a longitudinal length of between about 55 inches and about 70 inches, and more commonly between about 60 and 65 inches, to accommodate a single solar panel in a variety of sizes. Likewise, mounting unit 100 (or mounting unit 200) may have a transverse length of between about 45 inches and about 65 inches, and more commonly between about 50 and 60 inches.

As described previously, mounting surface 104 and one or more of the walls 106, 108, 110, and 112 may include one or more ribs, 126 and 127, respectively. The ribs, 126 and 127, may provide structural rigidity for mounting unit 100 and may also define channels that allow air to flow underneath and access a bottom surface of the attached solar panel 170 so as to provide passive ventilation and/or convection cooling of the solar panel and enhance electricity production. Put another way, ribs 126 and/or 127 may enable air convection from the lower front wall 110 to the higher rear wall 112 to remove heat from the under surface of solar panel 170 (i.e., the surface facing mounting surface 104). The channels defined by the ribs, 126 and 127, may also allow wind pressure to be equalized under the solar panel 170 by allowing air to flow around and over solar panel 170 and between solar panel 170 and mounting surface 104.

In some embodiment, the channels defined by ribs 126 and/or 127, may be narrow and may extend fully or partially from front surface or wall 110 to rear surface or wall 112. In other embodiments, a combination of transversely extending and longitudinally extending channels may be used. The channels may be between about 0.25 inches and 3 inches wide, and more commonly about 1 inch wide, and may be between about 0.25 inches and about 3 inches deep, and more commonly about 1 inch deep. Additionally, in some embodiments, mounting unit 100 may include one or more apertures or holes through one or more of walls 106, 108, 110, and 112 for wind pressure equalization and/or water drainage.

Mounting surface 104 also include one or more main channels that are sized wider and/or deeper than the channels defined by ribs 126 and/or 127. For example, mounting surface 104 is shown having one longitudinally extending main channel 124 that extends from left surface or wall 108 to right surface or wall 106, and shown having two transversely extending main channels 122 that each extend from front wall 110 to rear wall 112. In other embodiments, mounting surface 104 may include more or less main channels than those shown, which may each extend partially or fully between the various walls. Main channels, 122 and 124, may be used to route electrical cables and wires 180 that couple with solar panel 170 as shown in FIG. 6C. For example, electrical wires 180 may be routed from solar panel 170 through longitudinally extending main channel 124 and coupled with another solar panel (and mounting unit) positioned adjacent solar panel 170 and/or with another device, component, unit, and the like. Electrical wires and cables 180 may likewise be routed or run along transversely extending main channels 122 and coupled with adjacent solar panels, components, devices, units, and the like. In this manner, a grid or array of solar panels and mounting units may be coupled together atop a structure of building's roof to form a photovoltaic power generation system.

In some embodiments, main channels, 122 and/or 124, may be between about 2 inches and 6 inches wide, and more commonly about 4 inches wide, and may be between about 0.5 inches and about 3 inches deep, and more commonly about 1.25 inches deep. Main channels, 122 and/or 124, may likewise allow air to flow underneath and access the underside of solar panel 170 and thereby provide the benefits described above (e.g., wind pressure equalization, convection cooling, and the like). The deeper and wider main channels, 122 and 124, may allow air to easily pass underneath solar panel 170 and/or between solar panel 170 and mounting surface 104. In some embodiments, wind or air may flow underneath solar panel 170 through main channels, 122 and 124, and exit from underneath solar panel 170 through the narrow channels defined by ribs 126 to equalize wind pressure and/or cool solar panel 170.

Mounting unit 100 may also include a ground channel 128 within which a grounding lug or component (not shown) of solar panel 170 (or coupled therewith) may be positioned. The grounding lug or component (not shown) may be electrically coupled with an electric ground within ground channel 128. In some embodiments, ground channel 128 is positioned substantially centrally along rear wall 112 of mounting unit 100, although any other position may be possible.

Mounting unit 100 further includes one or more mounting feature or components 150 that allow mounting unit 100 to releasably couple with solar panel 170. In one embodiment, mounting unit 100 includes a mounting feature or component 150 positioned in each of four corners, as shown in FIGS. 1 and 3A-6C. As shown in the enlarged section A of FIG. 1, mounting feature 150 includes an insert 152 positioned and held within mounting surface 104. Mounting feature 150 may be configured (e.g., via edges or flanges 156) to prevent insert 152 from being withdrawn from mounting surface 104 in a direction normal to mounting surface 104. The insert 152 may be inserted into the mounting surface 104 after the mounting unit 100 is formed (e.g., via vacuum forming, injection molding, and the like), or may be integrated into the mounting surface 104 during the forming process, such as by positioning the insert or multiple inserts 152 in a mold and forming the mounting unit 100 onto or over insert(s) 152. Integrating the insert(s) 152 with mounting unit 100 in this manner may provide a more secure attachment with the mounting surface 104 and mounting unit 100. In some embodiments an insert 152 is not included and a pair of edges or flanges 156 of mounting feature 150 form an inverted T slot that provides the solar panel 170 mounting functions described below.

Insert 152, or alternatively edge pair 156, is shaped to receive a fastener 160 (see FIGS. 1A, 6A, and 6B) that secures solar panel 170 to mounting surface 104. Fastener 160 may include a bolt, pin, nail, screw, clip, button, magnetic member, and the like. Insert 152, or alternatively edge pair 156, has an inverted T-shaped cross section that defines a channel 154 within which fastener 160 is inserted. A pair of flanges 158 of insert 152, or alternatively edge pair 156, contact fastener 160 and prevent the fastener 160 from being withdrawn in a direction roughly normal or orthogonal to mounting surface 104. For example, fastener 160 may be a bolt that is slidingly inserted within channel 154 so that the bolt head is positioned under flanges 158, or edge pair 156. Flanges 158 contact the bold head and prevent removal of the bolt in a direction normal to mounting surface 104. Flanges 158 may similarly contact an enlarged feature or component of a pin, nail, screw, clip, button, magnetic member and the like to prevent removal of those fasteners in a direction normal to mounting surface 104. Instead of channel 154, insert 152 may include a plurality of longitudinally arranged apertures (not shown) through which fastener 160 is positioned, threaded, and/or locked. Fastener 160 may be longitudinally positioned with respect to insert 152, and thus mounting surface 104, by positioning, locking, or threading fastener 160 within a respective aperture. One advantage of channel 154 is that the fastener 160 may slide partially or fully along the length of insert 152, which allows fastener 160 to be longitudinally positioned virtually anywhere along insert 152 and thereby allows mounting unit 100 to accommodate and couple with a wider variety of solar panels sizes.

Figure 6B:
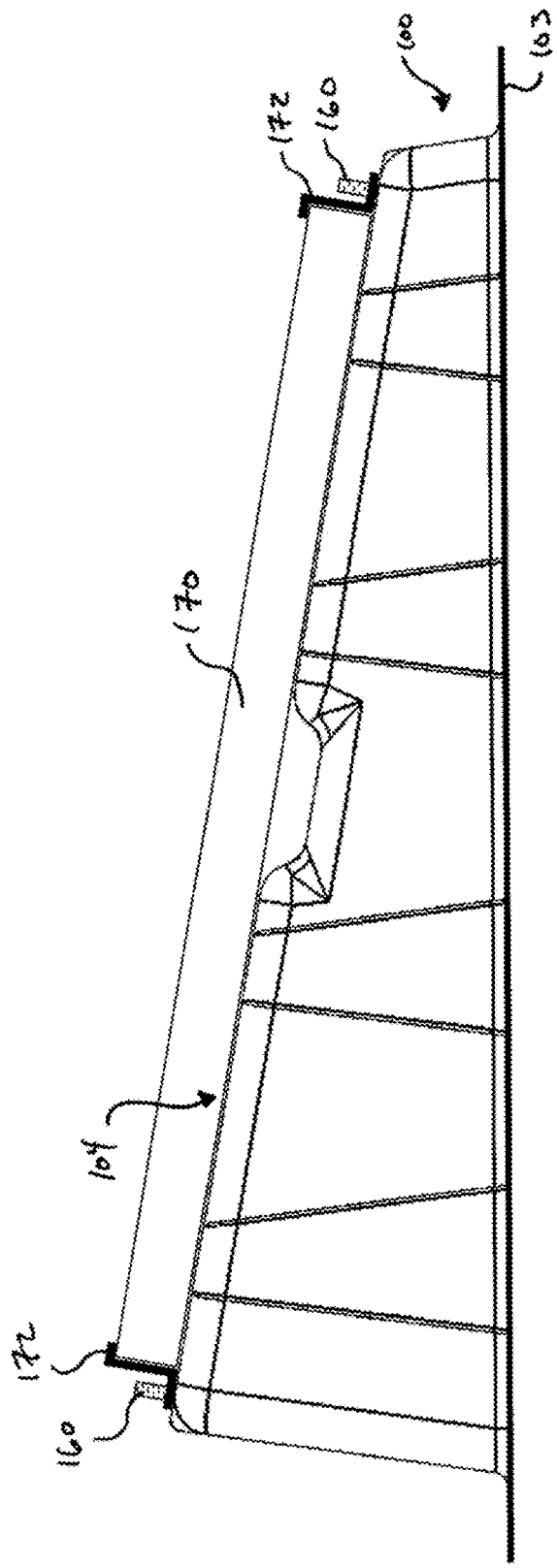

As shown in FIGS. 6A and 6B, fastener 160 may extend roughly normally from mounting surface 104 when positioned within insert 154. Fastener 160 couples with mounting hardware 172 of solar panel 170 to secure solar panel 170 to mounting unit 100. Mounting hardware 172 may include a Z profile mounting plate having an aperture (not shown) through which fastener 160 is inserted. A nut can then be threaded onto the bolt, or fastener 160 may otherwise be secured, to secure mounting hardware 172 (e.g., Z profile plate) to mounting surface 104. FIG. 6C illustrates solar panel 170 having a plurality of solar or photovoltaic cells secured atop mounting surface 104 of mounting unit 100 and mounting unit 100 secured to roof surface 190. As shown, mounting surface 104 may extend beyond solar panel 170 by an amount, B, which may be between about 1 and 10 inches and more commonly about 2 inches (amount B may vary between the longitudinal and transverse directions). This design may limit the amount of wind that can get under solar panel 170 and generate additional wind loads.

As mentioned previously, a flexible membrane or skirt 130 is coupled with mounting unit 100 to secure mounting unit 100 to the surface of roof 190. Flexible membrane or skirt 130 may extend around a portion or the entire periphery of base 102 and may be bonded to an underside of flange 103 or base 102 so that flexible membrane 130 extends laterally beyond flange 103 or base 102 a distance D of between about 1 inch and about 6 inches, and more commonly about 2 inches. In some embodiments, flexible membrane 130 may similarly extend in an opposite direction laterally into an interior of mounting unit 100 up to between about 1 inch and about 6 inches, and more commonly by about 2 to 4 inches. In some embodiments, flexible member 130 may include a solid membrane that spans the interior portion of mounting unit 100, although such embodiments may not allow individual mounting units to be stacked for convenient storage and/or transport as described herein. An interior portion of the solid member may be removed to allow the individual units to be conveniently stacked. Flexible membrane or skirt 130 may further help distribute the loads across the roof's surface to prevent or minimize concentrated or point loads.

As shown in FIG. 4, flexible membrane 130 may include multiple segments or strips sized roughly to correspond with a respective side of mounting unit 100 and positioned around the periphery of base 102. In another embodiment, flexible membrane 130 may include a single strip or piece that extends around the periphery, or may include multiple unconnected segments or strips (not shown) that are coupled with one or more sides of mounting unit 100. Flexible membrane 130 may be heat welded, adhesively bonded, mechanically fastened (e.g., via rivets, pins, clamps, and the like), and the like to the underside of flange 103 or base 102. Flexible membrane 130 may be made of roofing membrane materials such as: Thermo Plastic Olefin (TPO), Ethylene Propylene Diene Monomer (EPDM), Polyvinyl Chloride (PVC), thermoplastic vulcanizates (TPV), and the like. In one embodiment, the flexible membrane includes a TPO material with a polyester fleece attached to the bottom surface.

Flexible membrane or skirt 130 may function as a protective layer between flange 103 or base 102 and the roof surface 190 to prevent or limit motion between base 102 or flange 103 and the roof surface 190 that could otherwise result in roof penetrations and eventual leakage. The flexibility of membrane 130 may allow the membrane or skirt to compensate for small variations in the roof's surface 190, thereby functioning to ensure a firm and continuous bond between mounting unit 100 and the roof's surface 190. For example, flexible membrane 130 may flex or bend into or around creases, seams, bends, dips, and the like of roof surface 190 and bond with such uneven surfaces. Likewise, membrane or skirt 130 may conform to and bond with rough or gritty surfaces of the roof, such as asphalt or gravel roofs. The polyester fleece attached to the bottom of the membrane may enable mounting unit 100 to be adhesively bonded to such rough or gritty surfaces by absorbing liquid adhesives that bond with such surfaces. The flexibility of membrane or skirt 130 allows a portion or the entire periphery of mounting unit 100 to be sealed against the roof surface 190.

To secure mounting unit 100 to the roof, flexible membrane or skirt 130 couples with a membrane material of the roof, which may include Thermo Plastic Olefin (TPO); Ethylene Propylene Diene Monomer (EPDM); Polyvinyl Chloride (PVC); thermoplastic vulcanizates (TPV), Chlorosulfonated Polyethylene (CSPE), Co-polymer Alloy (CPA), Chlorinate Polyethylene (CPE), Ethylene-interpolymer (EIP), Nitrile Butadiene Polymer (NBP), Polyisobutylene (PIB), Keytone Ehtylene Ester (KEE), Modified Bitumen, and the like. Flexible membrane or skirt 130 may be coupled with the roof membrane via an adhesive, tape, heat welding, mechanical fasteners, and the like. For example, as shown in FIG. 5, a tape 140 may be positioned over flexible membrane or skirt 130 and roof surface membrane 190 and pressed onto those surfaces to secure and/or seal mounting unit 100 to the roof and/or to provide weatherproofing to an adhesively mounted mounting unit 100. Tape 140 may be placed around a portion or the entire periphery of the mounting unit 100. Alternatively or additionally, the portion of flexible membrane or skirt 130 laterally extending beyond base 102 or flange 103 may be heat welded to roof surface membrane 190 around a portion or the entire periphery of the mounting unit 100. For example, mounting unit 100 may be positioned against roof surface 190 and a heat welder or other device may be moved around the periphery of mounting unit to apply heat and/or pressure to the laterally extending flexible membrane 130 and the roof membrane so as to heat weld the membranes together. Flexible membrane or skirt 130 may likewise be adhesively bonded or mechanically fastened (e.g., via rivets and the like) to roof surface membrane 190 around a portion or the entire periphery of the mounting unit 100.

The type of fastening employed may depend on the membrane material of the roof 190 and/or skirt 130. For example, heat welding may be use to couple similar membrane materials of the skirt 130 and roof 190 (e.g., to couple a TPO skirt to a TPO roof membrane). Adhesives, mechanical fasteners, and/or tape 140 may be used to couple dissimilar membrane materials of the skirt 130 and roof, such as using polyester fleece and adhesives to couple skirt 130 to gravely or asphalt roofs and using adhesives to couple skirt 130 having membrane polymer A (e.g., TPO) to roof 190 having membrane polymer B (e.g., EPDM). Similarly, the membrane material used for skirt 130 may be selected based on the roof's membrane and the fastening method desired. For example TPO may be selected for the skirt 130 when heat welding is desired and roof 190 includes a TPO membrane. One advantage of coupling membrane or skirt 130 with the roof's membrane 190 using heat welding, adhesives, or tape is that aperture, holes, or other penetrations are not formed/created or minimally formed/created in the roof's membrane. This minimizes or eliminates water, air, and/or other leakage through the roof's membrane and the resulting problems associated therewith. Another advantage of using heat welding, adhesives, or tape to bond membrane or skirt 130 with roof surface 190 is providing a tight seal around a portion or the entire periphery of the mounting unit 100.

Flexible membrane or skirt 130 allows mounting unit 100 to easily couple with various types of roof surfaces. Flexible membrane or skirt 130 further allows mounting unit 100 and attached solar panel 170 to be easily removed from roof's surface 190 and positioned in another area of the roof's surface or on a different roof's surface. For example, flexible membrane 130 may be removed from mounting unit 100 so that mounting unit 100 and attached solar panel 170 may be uncoupled from the roof, moved to a different area or different roof, fitted with another membrane or skirt 130, and reattached to the roof's surface.

Figure 2:
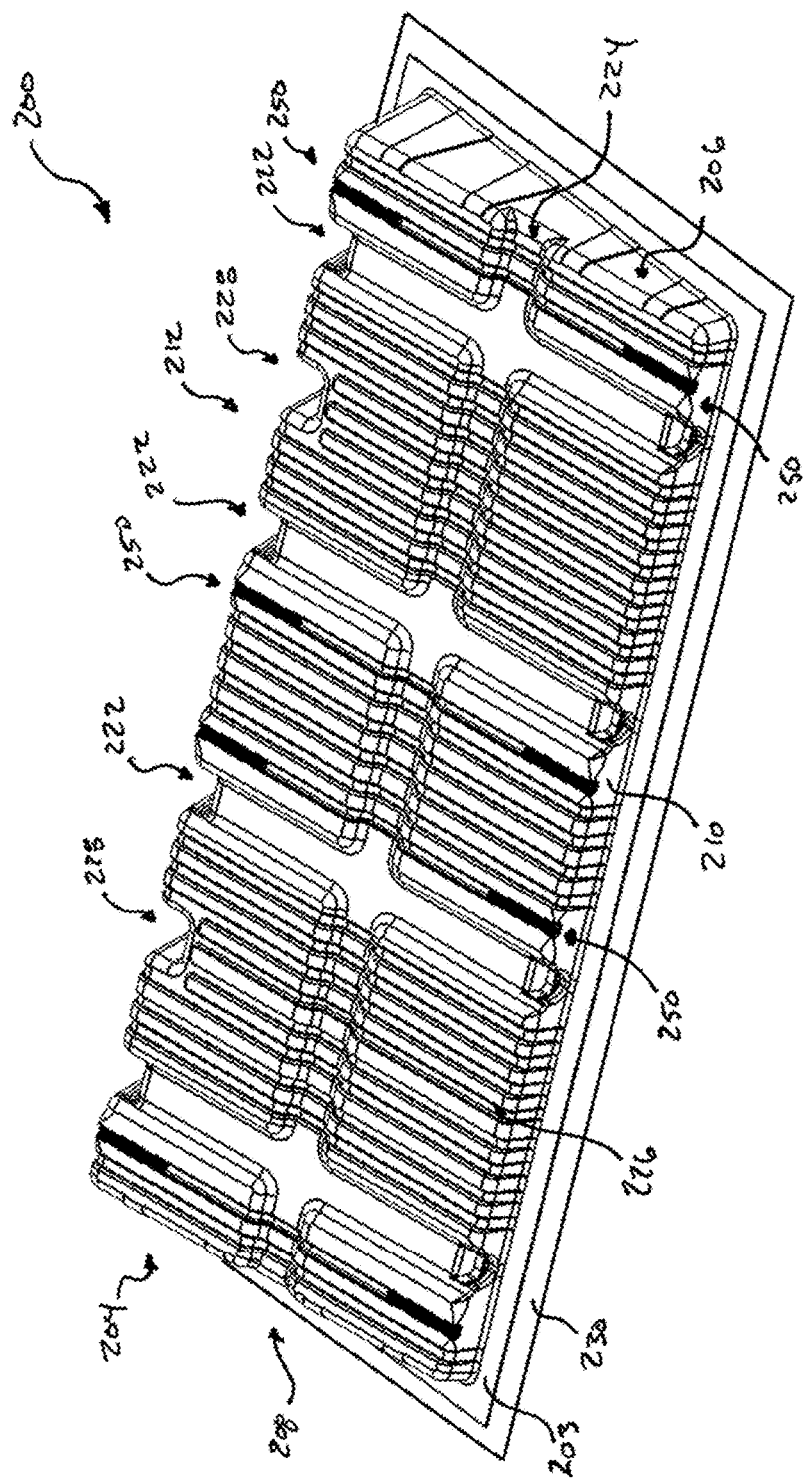
FIG. 2 illustrates a perspective view of an elongated mounting unit according to an embodiment of the invention.

Referring now to FIG. 2, illustrated is another embodiment of a mounting unit 200 having a longitudinally extended front wall 210 and rear wall 222 such that two solar panels (not shown) may be adjacently coupled atop a mounting surface 204 of mounting unit 200. Mounting unit 200 may be approximately twice the longitudinal length of mounting unit 100 to accommodate to solar or photovoltaic panels or modules. Mounting unit 200 may include various feature or components similar to those described above for mounting unit 100 including: mounting features 250, ribs 226 that define narrow channels, main channels 222 and/or 224, side walls 206 and 208, ground channels 228, a flange 203, a membrane or skirt 230, and the like.

Conduit for Mounting Units

Figure 7A:
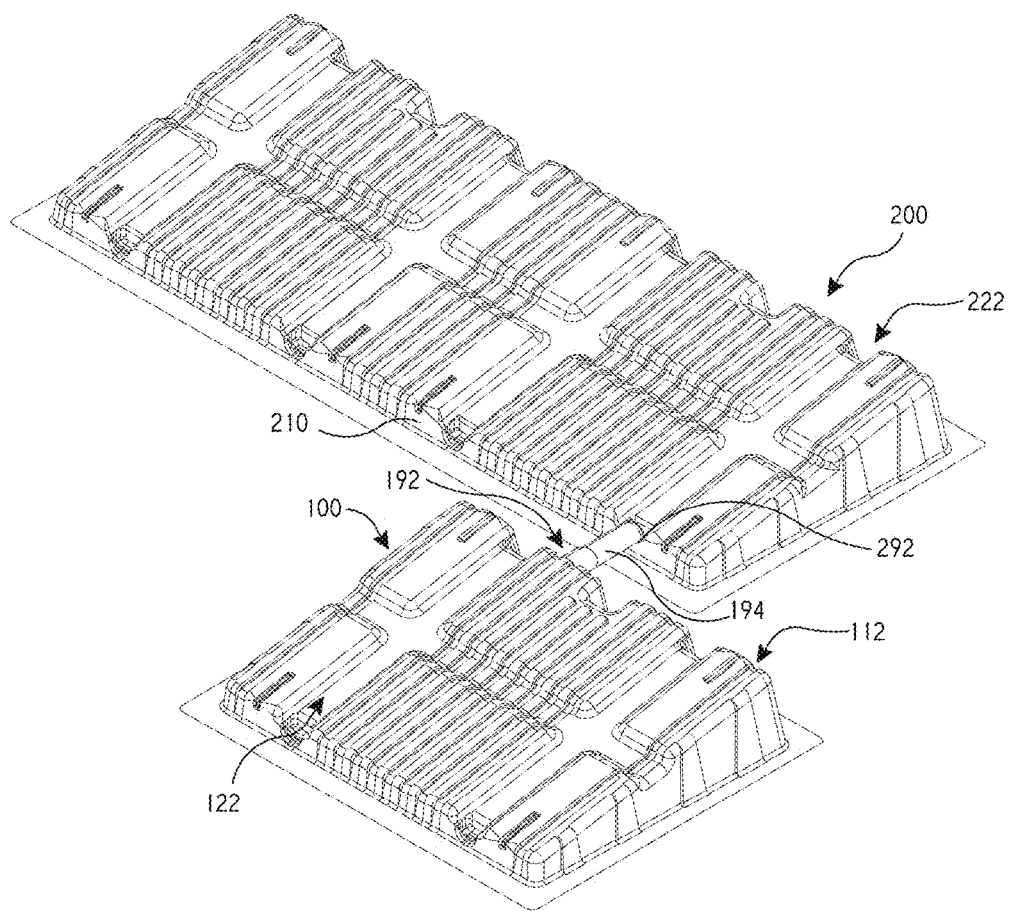

Referring now to FIGS. 7A-7C illustrated is a conduit 194 that may be used to connect the main channels of adjacent mounting units so as to route electrical wires or cables between adjacent mounting units and solar panels. Specifically shown is a mounting unit 200 positioned behind mounting unit 100. Conduit 194 is positioned within a recess 292 on the front wall 210 of mounting unit 200 and within a recess 192 on the back wall 112 of mounting unit 100. As shown in FIGS. 1 and 3C, each main channel 122 (or 222) may include a recess 192 that conduit 194 releasably snaps and locks into. Electrical wires or cables, such as wires 180 may be routed through conduit 192 between adjacent mounting units so as to prevent or limit exposure of the wires to various environmental or other conditions. Conduit 192 may be telescoping so as to be longitudinally adjustable to accommodate various mounting unit arrangements and spacing. To provide the telescoping feature, conduit 192 may include a first tube slidingly disposed within a second tube.

As shown in FIG. 7C, which is a side view of the mounting units of FIG. 7B cut along line A-A, recesses 192 and 292 of mounting units 100 and 200, respectively, may be positioned with respect to rear wall 112 and front wall 210, respectively, such that a spacing F exists between opposite ends of conduit 194 and the respective front and rear walls, 210 and 112. Spacing F may allow one or more wires 180 to be routed along main channel 222, into a distal end of conduit 194, out of a proximal end of conduit 194, and along main channel 122.

Exemplary Methods

Figure 8:
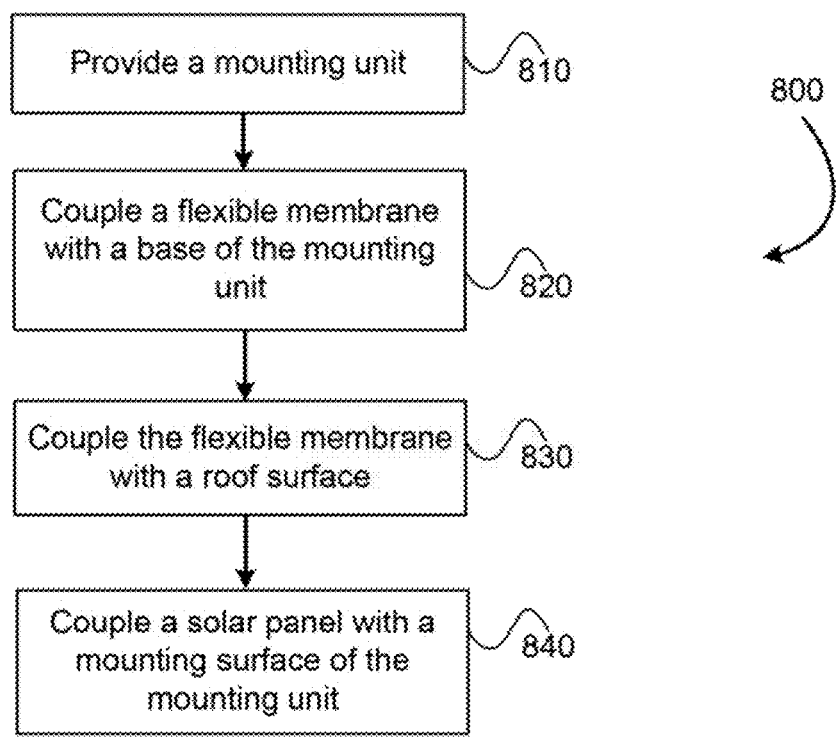
FIG. 8 illustrates a method of mounting a solar panel to a roof's surface according to an embodiment of the invention.

Referring now to FIG. 8, illustrated is a method 800 of mounting a solar or photovoltaic panel to a roof of a structure, such as a home or a building. At block 810 a mounting unit is provided or obtained. As described herein, the mounting unit may include a base and/or flange, a mounting surface, and a plurality of walls that connect the mounting surface to the base in an elevated and/or angled fashion. The mounting unit may also be designed to couple with a single solar panel or multiple solar panels as described herein. At block 820, a flexible membrane or skirt may be coupled with the base and/or flange. Coupling the flexible membrane or skirt with the base and/or flange may include heat welding, adhesive bonding, mechanical fastening, and the like. At block 830, the flexible membrane or skirt may be coupled with a surface of the roof to secure the mounting unit to the roof. Coupling the flexible membrane or skirt with the roof surface may include heat welding, adhesive bonding (e.g., adhesive and/or tape), mechanical fastening, and the like. At block 840, a solar panel may be coupled with a mounting surface of the mounting unit. Coupling the solar panel with the mounting surface may include inserting a bolt within a mounting channel of the mounting surface, positioning the bolt through an aperture of a mounting feature of the solar panel, and securing the bolt with respect to the solar panel. The mounting channel may be configured to prevent removal of the bolt in a direction substantially normal to the mounting surface and may comprise an inverted T shape slot as described herein.

The method may also include positioning one or more electrical wires of the solar panel within a main channel of the mounting surface so as to electrically couple the solar panel with one or more other devices. The one or more other devices may include an additional solar panel, a power device, a control device, a DC/DC optimization device, a combiner box, a disconnect switch, a breaker, fuses, a power inverter, and the like.

Exemplary Mounting Unit Configuration

In some embodiments, the flexible membrane material or skirt (hereinafter flexible membrane material) may be coupled with only a portion of the mounting unit's flange rather than around the entire periphery. This configuration may enable the mounting unit to be quickly and easily coupled with a roof while providing sufficient holding strength for the mounting unit. For example, the mounting unit may not need a flexible membrane material to be positioned around the entire perimeter in order to secure the mounting unit to the roof. Positioning the flexible membrane material around less than the entire perimeter may speed up the installation process since an installer is not required to heat weld or otherwise bond or couple all four sides of the mounting unit to the roof.

Figure 9A:
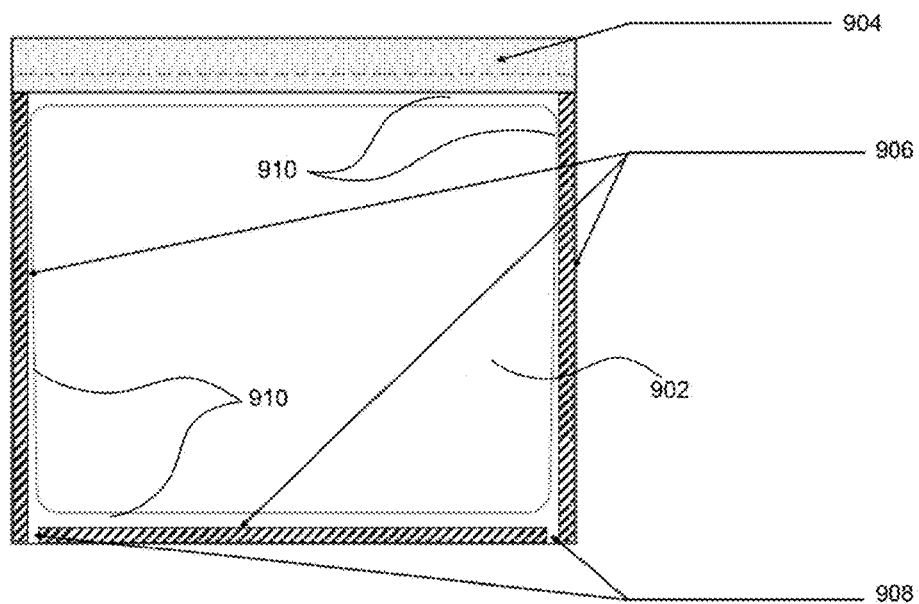
FIGS. 9A-C illustrate a mounting unit for a solar panel wherein the mounting unit includes a flexible material membrane skirt that is attached to at least one flange and less than all the flanges of the mounting unit according to an embodiment of the invention.
Figure 9B:
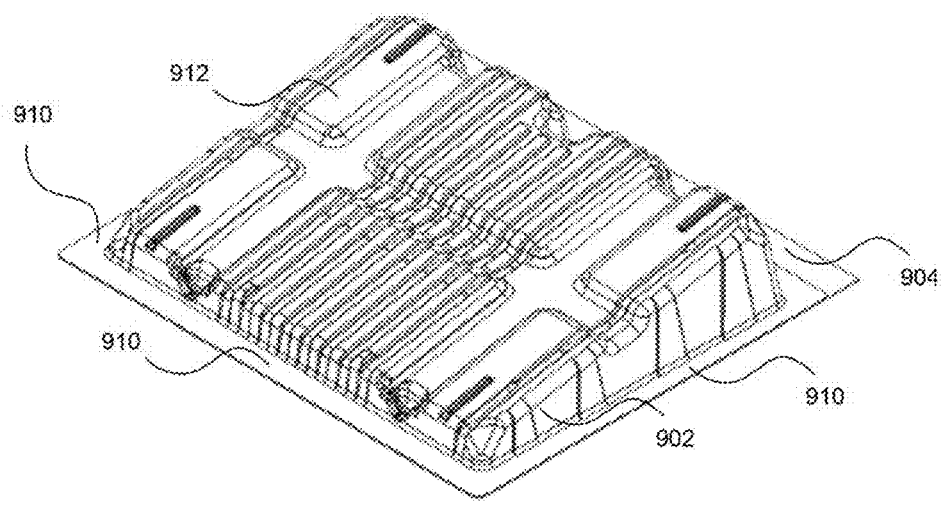
Figure 9C:
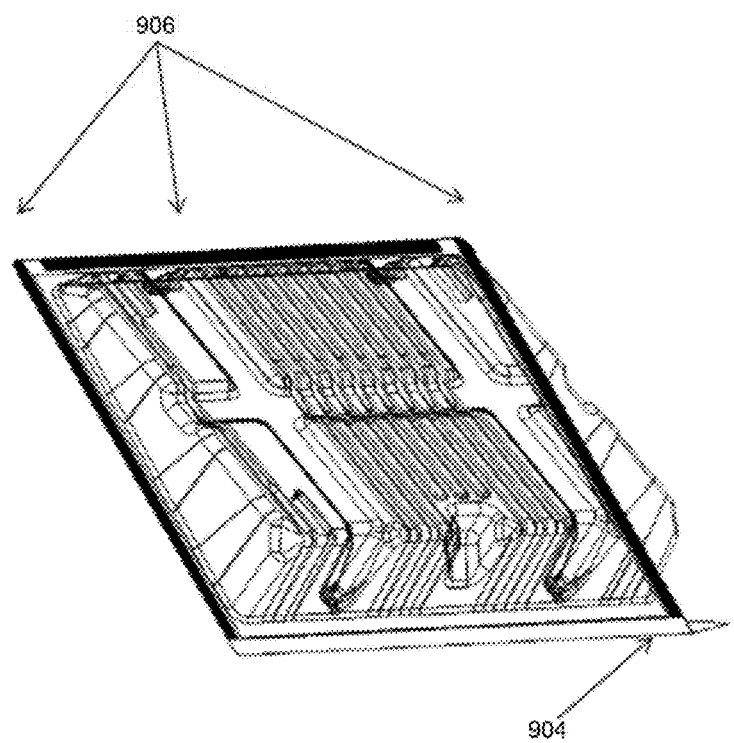

FIG. 9A illustrates one embodiment of such a mounting unit. The mounting unit of FIG. 9A is similar to those previously described in that the mounting unit includes a base 902 that is configured for positioning atop a roof. The base 902 includes flanges 910 that are positioned around the perimeter or periphery of the base 902 and that extend laterally therefrom. In some embodiments, the base 902 may include only a few flange sections (i.e., a front flange and a rear flange) rather than a flange that extends around the entire perimeter or periphery of base 902. As shown in FIGS. 9B and 9C, a mounting surface 912 is positioned above the base 902 via walls that connect the mounting surface 912 and the base 902 as previously described. The mounting surface 912 is configured to couple with a solar panel to elevate the solar panel above a surface of the roof and to orient the solar panel at an angle relative to the roof.

A flexible membrane material 904 is coupled or attached to one of the flanges 910 of base 902. The flexible membrane material 904 is attached to the flange 910 so as to extend laterally therefrom. As shown in the embodiment of FIGS. 9A-9C, the flexible membrane material 904 may be attached to a rear flange 910 of the base 902, although in other embodiments, the flexible membrane material 904 may be coupled with another one of the base's flanges and/or with multiple flanges. An important aspect of the embodiments of FIGS. 9A-9C is that the flexible membrane material 904 is coupled or attached with fewer than all of the base's flanges 910. Stated differently, the base 902 includes flanges 910 that do not include, or are otherwise free of, a flexible membrane material 904. Rather, an adhesive or tape material 906 is applied to an underside or bottom surface of one or more of those flanges that do not include the flexible membrane material 904. As shown in FIG. 9A, a front flange and two opposing side flanges 910 are each free of, or otherwise do not include, the flexible membrane material 904, but include an adhesive or tape material 906 applied to the bottom surface of the flanges 910.

This configuration—i.e., having at least one flange with the flexible membrane material 904 and at least one flange with an adhesive/tape 906 rather than the flexible membrane material 904—allows an installer to quickly and conveniently couple the mounting unit with a roof. For example, as shown in FIG. 9C, an installer merely needs to couple the single flexible membrane material 904 with the roof and the mounting unit can be pivoted about the coupled flexible membrane material 904. The installer may then easily remove a film that is applied over the adhesive or tape 906 and pivot the mounting unit downward so that the adhesive or tape 906 contacts the roof's surface to adhesively bond the mounting unit with the roof. The film applied to the adhesive or tape 906 may prevent or limit degradation of the adhesive material prior to adhering the adhesive or tape 906 with the roof.

In a specific embodiment, the mounting unit includes only a single flange having the flexible membrane material 904, such as the rear or back flange shown in FIGS. 9A-9C. In such an embodiment, one or more of the other flanges, and in a specific embodiment the other three flanges, include the adhesive or tape 904. The configuration enables quick install of the mounting unit since the flexible membrane material 906 attached to the rear flange may be coupled with the roof and then the mounting unit pivoted upward and downward to remove a film from the adhesive or tape 904 and to apply the adhesive or tape to the roof surface.

As shown in FIG. 9A, in some embodiments, at least one portion or segment of the adhesive or tape 906 includes a gap 908. In the embodiment illustrated of FIG. 9A, the adhesive or tape 906 includes two gaps 908 that are positioned near opposing sides of the base. The gap(s) 908 may be formed from the adhesive or tape 906 that is positioned on the front flange of the mounting unit, such as by extending the adhesive or tape 906 along less than the entire edge of the front flange. The gap(s) 908 may likewise be formed in or along any of the mounting unit's other sides. The gaps(s) 908 may promote drainage of water or other fluids by providing a channel through which the fluid may drain. The gap(s) 908 help prevent accumulation and stagnation of water or other fluids within the mounting unit and under an attached PV module.

In some embodiments, the adhesive or tape 906 may not extend from beyond an edge of the mounting unit's flange. Rather, the adhesive or tape 906 may extend substantially up to, or slightly retracted from, the flange's edge. In contrast, the flexible membrane material 904 typically does extend beyond the flange's edge in order to allow a heat welding machine, or other machine, to bond the flexible membrane material 904 with the roof. Exemplary adhesives or tapes include butyl, acrylic, and/or polyurethane-based adhesives or tapes, that may or may not be pressure-sensitive, suitable for exterior use in roofing-type applications.

According to one embodiment, a method of attaching a solar panel mounting unit to a roof includes providing a solar panel mounting unit having: a base that includes a first flange and a second flange that extend laterally from the base; a mounting surface positioned above the base via walls that connect the mounting surface and the base, the mounting surface being couplable with a solar panel to elevate the solar panel above a surface of the roof and angle the solar panel relative thereto; a flexible membrane coupled with the first flange of the base and extending laterally therefrom; and an adhesive or tape applied to an underside of the second flange, the second flange being free of the flexible membrane material. The method also includes coupling the flexible membrane material with the roof to secure the solar panel mounting unit to the roof and adhesively bonding the adhesive or tape with the roof to additionally secure the mounting unit to the roof. As described above, the flexible membrane material may be initially bonded or coupled with the roof and the mounting unit pivoted upward to remove a polymeric or other film from the adhesive or tape. The mounting unit may then be pivoted downward and into contact with the roof to adhere the adhesive or tape with the roof.

As described above, the flexible membrane material and/or adhesive/tape may be coupled with the mounting unit in a variety of configurations. For example, in some embodiments the method may include coupling the flexible membrane material with only the first flange of the base (e.g., toward the rear of the base) and applying the adhesive or tape with an underside of at least one other flange of the base (e.g., the second flange), such as the front and/or side flanges. In some embodiments, the method may also include forming a gap or gaps in at least one portion or segment of the adhesive or tape, such as near the front flange and on opposite sides of the front flange. The method may additionally include heat welding the flexible membrane material to the roof and removing a film from the adhesive or tape prior to adhesively bonding the adhesive or tape with the roof. The film may prevent or limit degradation of an adhesive material. In some embodiments, an adhesive or tape may be used to bond the flexible membrane material to the roof rather than heat welding the flexible membrane material to the roof. This approach may be preferred in applications that involve rubber roof materials, such as EPDM, since the flexible membrane material (e.g., TPO) may not be heat weldable to such roofing materials. In such embodiments, the flexible membrane material may be heat welded to the a flange of the base, such as toward the rear of the base, but the flexible membrane material would be taped or adhered to the roof surface.

Exemplary Mounting Methods

Figure 15A:
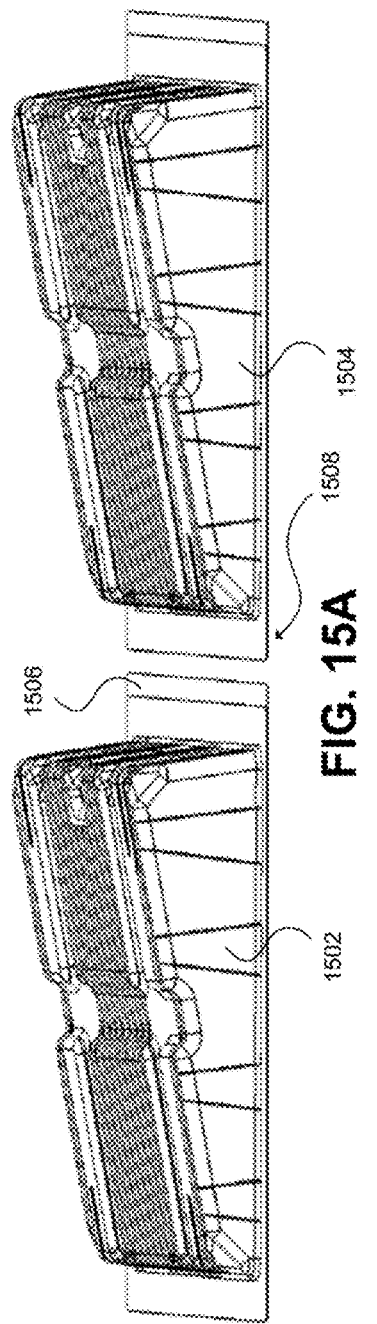
FIGS. 15A and 15 B illustrate a method of mounting adjacent mounting units atop a roof according to an embodiment of the invention.
Figure 15B:
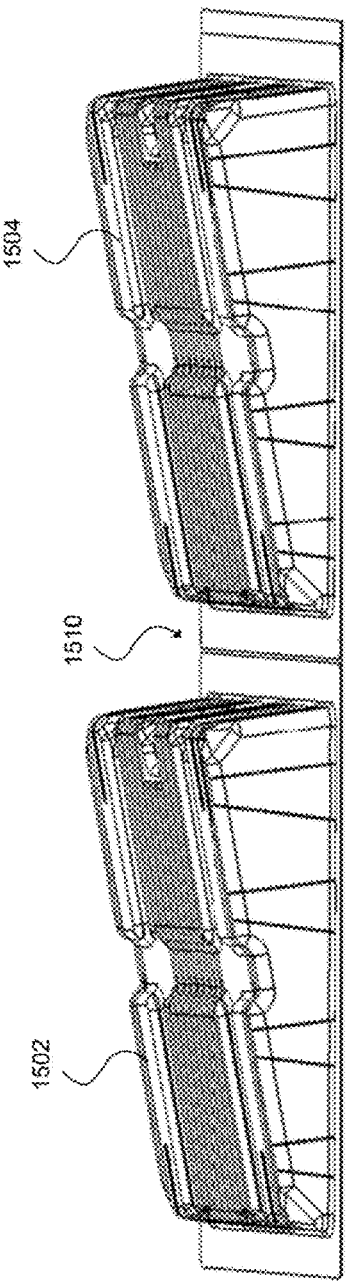

Referring now to FIGS. 15A and 15B, illustrated are embodiments showing a specific method of mounting adjacent mounting units. As shown in FIG. 15A, according to one embodiment, a first mounting unit 1502 may be attached to a roof, such as using the method described above. For example, a flexible membrane material 1506 positioned on a rear surface of the first mounting unit 1502 may be heat welded to the roof. A front edge 1508 of a second mounting unit 1504 may then be positioned over and adhered to the flexible membrane material 1506 of the first mounting unit 1502. The front edge 1508 of the second mounting unit 1504 includes an adhesive or tape having a film that is removed as previously described prior to adhering the front edge 1508 with the flexible membrane material 1506. In coupling the first and second mounting units, 1502 and 1504, the second mounting unit 1504 may be pivoted upward and downward to adhere the front edge 1508 with the flexible membrane material 1506 and to remove the film from the adhesive or tape. FIG. 15B illustrates the two mounting unit coupled together with the front edge 1508 of second mounting unit 1504 overlapping 1510 the flexible membrane material 1506 of first mounting unit 1502.

According to one embodiment, the coupling method described above may further include aligning a plurality of mounting units atop a roof by: coupling a flexible membrane material of a first mounting unit with the roof, positioning a front flange of a second mounting unit atop the flexible membrane of the first mounting unit, and adhesively bonding—via the adhesive or tape—the front flange of the second mounting unit with the flexible membrane of the first mounting unit.

The above described longitudinal spacing of adjacent mounting units, where the front flange of one mounting unit overlaps the adjacent flexible membrane material or skirt of the adjacent mounting unit, allows for increased roof power density. For example, for every 27-36 rows with this overlapping configuration, another row of mounting units can be placed onto a roof, thereby increasing the power density of the roof by roughly 3-4%, depending on the exact amount of overlap. As such, the power generated by mounted solar panels is increased, which lessens the dependence of the structure or building on external power sources, such as coal or other power sources, that may contribute to climate change.

Exemplary Spacing Jig

Referring now to FIGS. 14A-14D, illustrated are embodiments of spacing members or apparatus (hereinafter spacing jig) that may be used to space mounting units atop a roof. The spacing jig 1400 of FIG. 14A may be used to longitudinally space the mounting units while the spacing jig 1420 of FIG. 14B may be used to laterally space the mounting units.

Figure 14A:
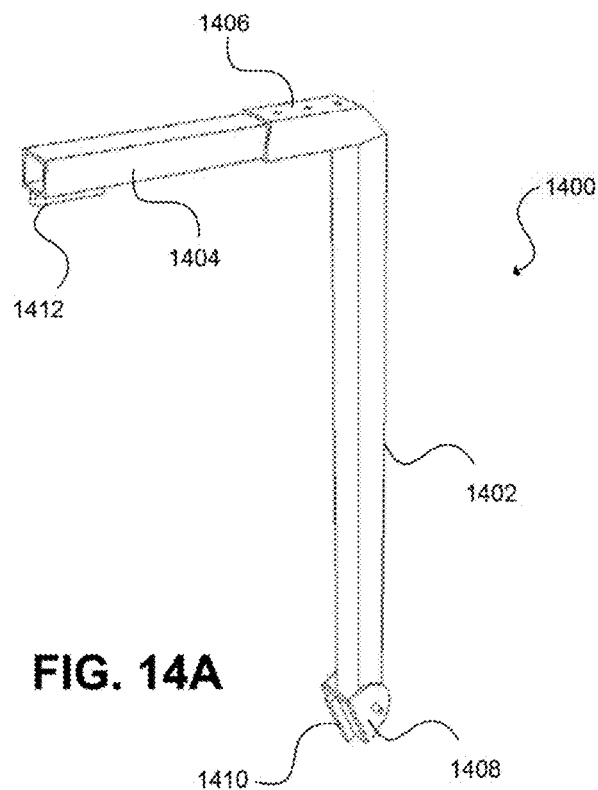

Referring first to the spacing jig of FIG. 14A, the spacing jig 1400 includes a first longitudinal member or section 1402 and a second longitudinal member or section 1404 that is coupled with the first longitudinal member 1402 at an angled orientation relative thereto. The first and/or second members, 1402 and 1404, may include tubing having a square, circular, or other cross section. The first member 1402 includes a pivot member 1408 that is pivotally attached to a proximal end of the first member 1402. The pivot member 1408 includes a first tab or flange 1410 that may be positioned within a corresponding groove of a first mounting unit 1440 as shown in FIG. 14C. The groove of the first mounting unit 1440 may be a T shaped slot as described herein that is positioned near the front surface of the first mounting unit 1440.

The second member 1404 is coupled with the distal end of the first member 1402 so as to form an angle relative thereto. As shown in FIG. 14A, the first and second members, 1402 and 1404, may form a roughly 90 degree angle or any other angle desired, such as between 45 and 135 degrees. The second member 1404 may be telescopingly inserted within a third member 1406 that is directly attached to the distal end of first member 1402 or integrally formed therewith. The second member 1404 may be telescopingly elongated or shortened by sliding the second member 1404 within the third member 1406 as desired. The third member may include a plurality of apertures and the second member may include a plurality of detents to hold or maintain the two members in a desired elongated or shortened configuration. A second tab or flange 1412 is positioned on the distal end of the second member 1404. The second flange 1412 may be positioned within a corresponding groove of a second mounting unit 1430 as shown in FIG. 14C. The groove of the second mounting unit 1430 may be a T shaped slot as described herein that is positioned near the rear surface of the second mounting unit 1430. Positioning of the first flange 1410 within the first mounting unit 1440's slot and the second flange 1412 within the second mounting unit 1440's slot longitudinally aligns the two mounting units in a front to back orientation.

According to one embodiment, the above described method may further include positioning a first mounting unit 1440 atop the roof and positioning a second mounting unit 1430 atop the roof. The first flange 1410 of the spacing jig 1400 may be positioned within a slot of the first mounting unit 1440 and the second flange 1412 of the spacing jig 1400 may be positioned within a slot of the second mounting unit 1430. Said positioning of said first and second flange members, 1410 and 1412, within said respective slots said first and second mounting units, 1440 and 1430, longitudinally aligns said mounting units. To insert or position the second flange 1412 within the slot of the second mounting unit 1430, the spacing jig 1400 may be pivoted downward relative to the mounting units and into position via pivot member 1408. The second member 1404 may be slid within or with respect to the third member 1406 to achieve a desired spacing prior or subsequent to inserting said flanges members within said respective slots of said mounting units. In some embodiments, a pair of spacing jigs 1400 may be used to space the adjacent units.

Figure 14B:
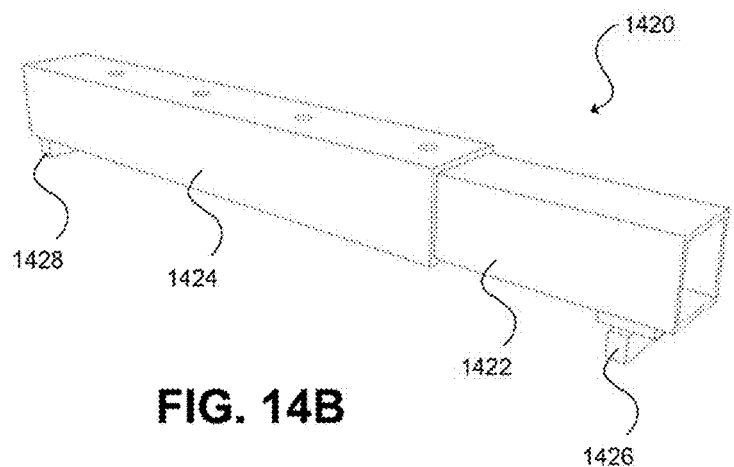

Referring now to the spacing jig 1420 of FIG. 14B, the spacing jig 1420 includes a first longitudinal member or section 1422 and a second longitudinal member or section 1424 that is telescopingly disposed within the first longitudinal member 1402. The first and/or second members, 1422 and 1424, may include tubing having a square, circular, or other cross section. The first member 1422 includes a first tab or flange 1426 that is positioned on a proximal end thereof and that may be positioned within a corresponding groove of a first mounting unit 1440 as shown in FIG. 14D. The first flange 1426 may be oriented roughly orthogonal to the first member 1422 to facilitate positioning of the flange 1426 within the groove of the first mounting unit 1440. The groove of the first mounting unit 1440 may be a T shaped slot as described herein that is positioned near a side edge of the first mounting unit 1440.

The spacing jig 1420 may be telescopingly elongated or shortened by sliding the first member 1422 within the second member 1424. The second member 1424 may include a plurality of apertures and the first member 1422 may include a plurality of detents to hold or maintain the two members in a desired elongated or shortened configuration. In some embodiments, the adjustment of the two members may utilize a spring-loaded push button or a set screw for continuous (i.e., minimally small) adjustment increments.

A second tab or flange 1428 is positioned on a distal end of the second member 1424. The second flange 1428 may be positioned within a corresponding groove of a second mounting unit 1430 as shown in FIG. 14D. The groove of the second mounting unit 1430 may be a T shaped slot as described herein that is positioned near a side edge of the second mounting unit 1430. The second flange 1428 may be oriented roughly orthogonal to the second member 1424 to facilitate in positioning of the second flange 1428 within the groove of the second mounting unit 1430. Positioning of the first flange 1426 within the first mounting unit 1440's slot and the second flange 1428 within the second mounting unit 1440's slot longitudinally aligns the two mounting units in a side to side orientation.

According to one embodiment, the above described method may further include positioning a first mounting unit 1440 atop the roof and positioning a second mounting unit 1430 atop the roof. The first flange 1426 of the spacing jig 1420 may be positioned within a slot of the first mounting unit 1440 and the second flange 1428 of the spacing jig 1420 may be positioned within a slot of the second mounting unit 1430. Said positioning of said first and second flange members, 1426 and 1428, within said respective slots of said first and second mounting units, 1440 and 1430, laterally aligns said mounting units. The first member 1422 may be slid within or with respect to the second member 1424 to achieve a desired spacing prior or subsequent to inserting said flanges members within said respective slots of said mounting units. As shown in FIG. 14D, a pair of spacing jigs 1420 may be used to space the adjacent units.

Exemplary Reinforced T-Slots

In some instances it may be desirable to reinforce the slots or grooves (i.e., the previously described mounting feature 150) of the mounting unit. The slots or grooves described in the embodiments herein below may have a configuration to those previously described—i.e., the previously described mounting feature 150. Specifically, the slots or grooves may have an inverted T shape configuration that is shaped and sized to accommodate a separate coupling component or member that couples with the solar panel or PV module. For ease in describing the embodiments, the slots will be referred to generally as slots or T-slots. Reinforcing the slots of the mounting unit may increase the wind uplift resistance of the unit. For example, the reinforced slots may prevent or limit an attached solar panel from pulling or tearing through the slots of the mounting unit. The reinforced slots may be configured or designed to distribute the load across the mounting unit, which aids in securing the solar panel more firmly to the mounting unit.

Figure 10A:
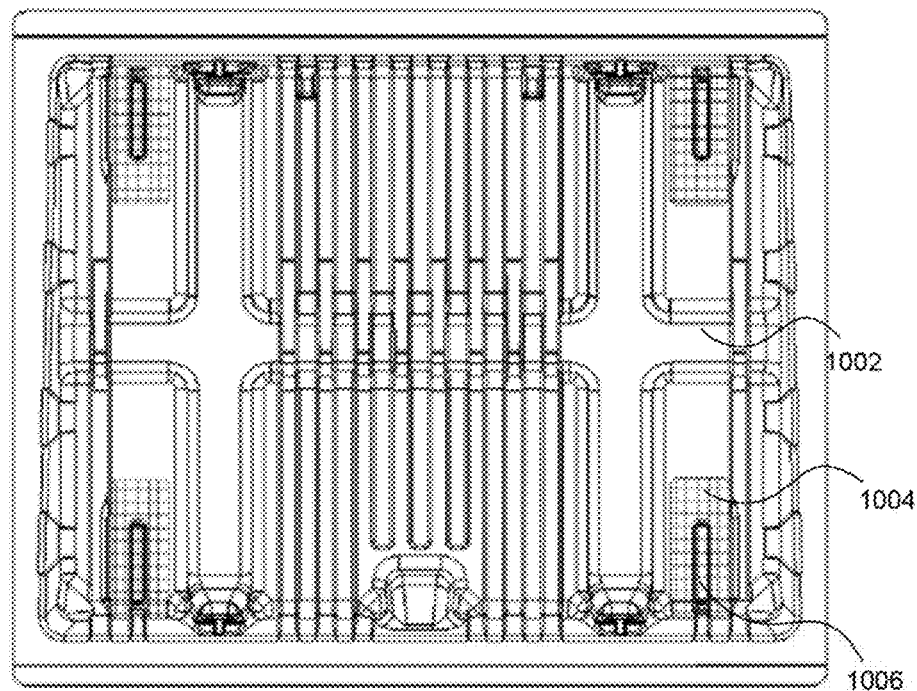
FIGS. 10A-11C illustrate mounting units having reinforced coupling slots or mounting features according to an embodiment of the invention.

Referring now to FIGS. 10A-11C, illustrated are embodiments in which the mounting unit's slots are reinforced. FIGS. 10A-10B illustrate a mounting unit 1002 that includes a base, a plurality of walls that extend upward from the base, and a mounting surface connected with and positioned above the base via the plurality of walls as previously described. The mounting surface includes a plurality of slots 1006 that are each configured to receive a coupling component or mounting rail that facilitates in coupling the solar panel atop the mounting surface as previously described. At least one slot 1006, and typically each slot, is reinforced to more securely couple the solar panel atop the mounting unit 1002 and thereby increase the wind uplift resistance of the mounting unit. The reinforced slot(s) allow the mounting unit 1002 to be installed in areas of the roof that may experience greater wind forces and/or in locations that are traditionally windy, such as coastal regions.

FIG. 10A illustrates a bottom plan view of the mounting unit 1002. To reinforce the slots 1006, a mesh material 1004 is integrally formed into the mounting surface at each reinforced slot location. The mesh material 1004 may be a tape or film that includes fiber reinforcement made from glass, carbon, Kevlar, or other suitable materials, or any combination thereof. Preferable, the tape or film 1004 is of a similar chemistry to the underlying material of the mounting unit 1002, so that the reinforced tape or film 1004 is properly bondable to the base material of mounting unit 1001 during the thermoforming process or in a separate process. In a specific embodiment, the mesh material 1004 (e.g., tape or film) is vacuum molded or insert molded into the mounting surface of mounting unit 1002 at each reinforced slot location 1006. The mesh material 1004 may be integrally formed with each slot location 1006 and/or may be positioned near a lower or bottom surface of the reinforced slot.

Figure 10B:
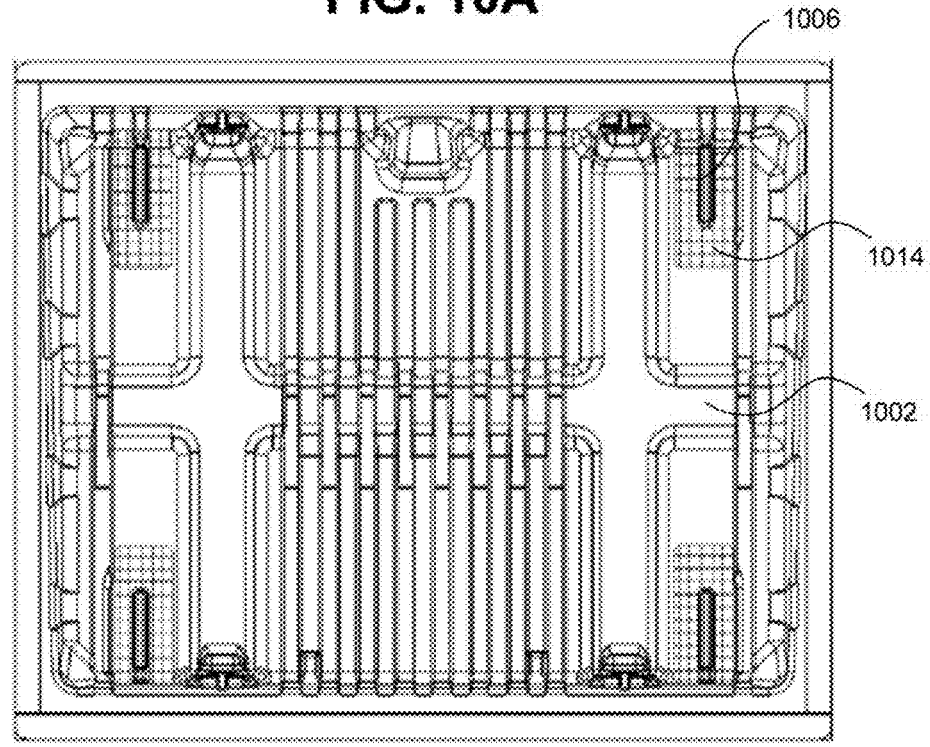

FIG. 10B illustrates a top plan view of the mounting unit 1002. To reinforce the slots 1006, a mesh material 1014 is attached to a top surface of the mounting surface at each reinforced slot location 1006. As previously described, the mesh material 1014 may be a tape or film that includes fiber reinforcement made from glass, carbon, Kevlar, or other suitable materials, or any combination thereof. The tape or film 1014 may be of a similar chemistry to the underlying material of the mounting unit 1002. In a specific embodiment, the mesh material or tape 1014 is adhesively bonded with the mounting surface's top surface at each reinforced slot location 1006 subsequent to forming of the mounting unit 1002. As such, the mesh material 1014 may be retrofitted to existing mounting unit models. In some embodiments, the mesh material or tape 1014 may increase the stiffness of the entire base unit by adding the reinforced tape to all or part of the mounting surface of the unit 1002. The mesh materials of FIGS. 10A and 10B (i.e., mesh material 1004 and 1014) help distribute the wind uplift loads about the mounting unit 1002 and/or counteract the wind uplift loads via the reinforcing fibers.

Figure 11A:
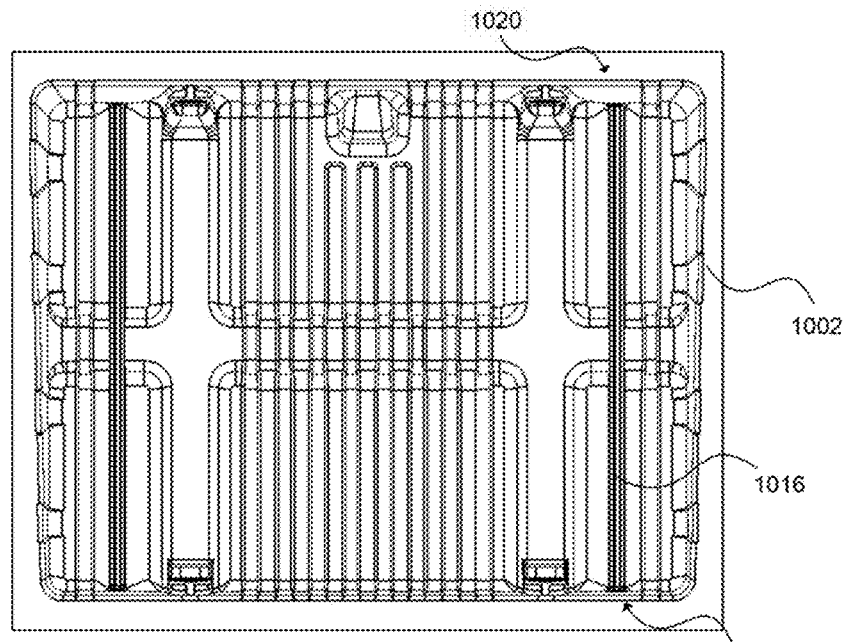

FIGS. 11A-11O illustrate a mounting unit 1002 that includes a base, a plurality of walls that extend upward from the base, and a mounting surface connected with and positioned above the base via the plurality of walls as previously described. The mounting surface includes a plurality of slots that are reinforced and configured to receive a coupling component or mounting rail as previously described. At least one of the slots in FIGS. 11A-11O is extended or elongated. The longer or elongated slots help to distribute uplift loads from the solar panel onto a larger area of the mounting unit 1002, which may increase the overall rigidity of the mounting unit 1002. As shown in FIGS. 11A-11O, the mounting unit 1002 may include one or more elongated slots. To accommodate the elongated slots, the mounting unit 1002 may or may not include the longitudinally extending main channel 124 and/or transversely extending main channels 122. The elongated slots reduce the stress induced by wind forces by distributing the load over a greater area of the mounting unit 1002, thereby minimizing or eliminating point loads.

FIG. 11A illustrates a first embodiment where the mounting unit 1002 includes a reinforced slot in the form of an elongated slot 1016 that extends from adjacent a first side 1018 of the mounting unit 1002 to adjacent a second side 1020 of the mounting unit 1002 that is opposite the first side 1018. The mounting unit 1002 of FIG. 11A also includes a second similar shaped elongated slot 1016 that is positioned near an opposite side of the mounting unit 1002. The two elongated slots 1016 traverse longitudinally along the mounting unit 1002 between the first side 1018 and the second side 1020. In some embodiments, the opposing ends of the elongated slot 1016 may extend to within one inch of the opposing sides, 1018 and 1020, of the mounting unit 1002.

Figure 11B:
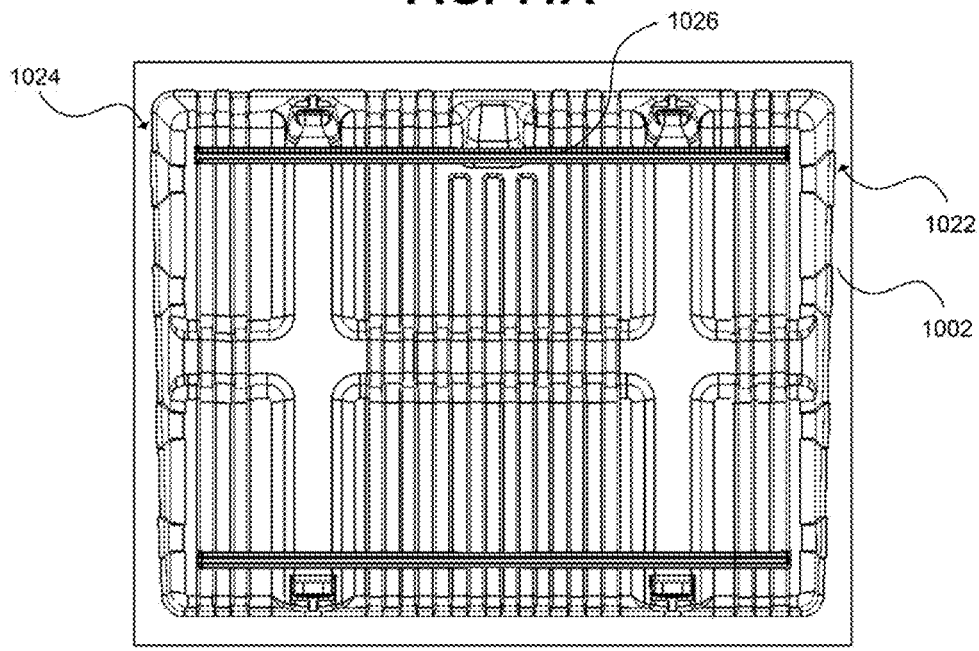
Figure 11C:
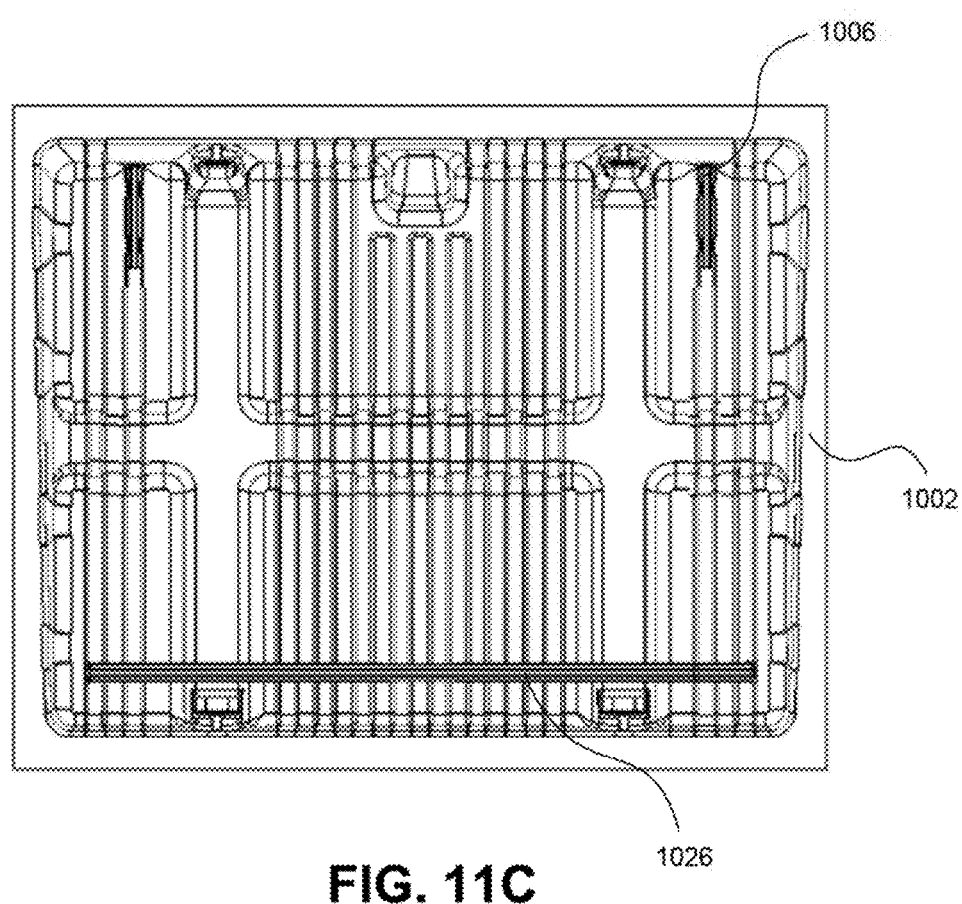

FIG. 11B illustrates a second embodiment of the mounting unit 1002 wherein the reinforced slots are in the form of elongated slots 1026. The mounting unit 1002 of FIG. 11B differs from that of FIG. 11A in that the elongated slot 1026 traverses laterally across the mounting unit 1002 between a first side 1022 and a second side 1024 of the mounting unit 1002. The mounting unit 1002 includes a second similarly shaped elongated slot 1002 that is positioned near the opposite side of the mounting unit. In some embodiments, the opposing ends of the elongated slot 1026 may extend to within one inch of the opposing sides, 1022 and 1024, of the mounting unit 1002. FIG. 11C illustrates that the mounting unit 1002 may include a combination of an elongated slot 1026 and a shorter slot 1006 as desired. In a specific embodiment, the elongated slot 1026 may be positioned near a rear or other edge of the unit that experiences greater wind uplift forces.

Other methods of reinforcing the mounting unit's slots may include the use of a plurality of fasteners, such as hardware clamps and butyl tape, to secure the solar panel to the mounting unit. Other methods of reinforcing the mounting unit's slots may include forming or molding geometric features into the slots that are configured to specifically increase the wind uplift resistance. For example, the slots may be formed with a diagonal or cross-hatch pattern that increases the wind uplift resistance, such as by distributing wind uplift forces to a larger area of the mounting unit.

According to one embodiment, a method of reinforcing a solar panel mounting unit includes providing a solar panel mounting unit having: a base, a plurality of wall that extend upward from the base, a mounting surface connected with and positioned above the base via the plurality of walls, and a plurality of slots that are formed in the mounting surface and configured to receive a coupling component that facilitates in coupling the solar panel atop the mounting surface. The method also includes reinforcing at least one of the plurality of slots, and preferably each slot, so that the reinforced slots exhibit an increased ability to secure the solar panel atop the mounting unit and/or increase the wind uplift resistance of the mounting unit.

In some embodiments, reinforcing the slots includes integrally forming a mesh material into the mounting surface at each slot location, such as by vacuum molding or insert molding the mesh material into the mounting surface at each reinforced slot location. In other embodiments, reinforcing the slots includes attaching a mesh material or tape to a top surface of the mounting surface at each reinforced slot location, such as by adhesively bonding the mesh material or tape with the mounting surface's top surface at each slot location. In yet another embodiment, reinforcing the slots includes forming elongated slots in the mounting surface, where each elongated slot extends from adjacent a first side of the mounting surface to adjacent a second side of the mounting surface that is opposite the first side. In such embodiments, the mounting surface may include two elongated slots that are positioned toward opposing sides of the mounting unit.

Electrically Conductive Clamps

In some instances it may be desirable to electrically couple any exposed or "dead" conductive pieces or parts of the mounting unit with the attached PV module. Such electrical coupling may be done to ground the exposed conductive pieces and thereby prevent those pieces from generating a large electric potential. The term exposed or "dead" conductive pieces means any material that is capable of generating an electric potential and that is not connected to ground. Such pieces may include the coupling component or mounting rail (e.g., insert 152) that is inserted within the slot (e.g., mounting feature 150), or may include one or more fasteners that attach the mounting unit to the roof and/or the PV module to the mounting unit. In some embodiments the exposed or dead conductive pieces may be electrically coupled to the PV module using a conductive clamp. The conductive clamp may be made of metal and be configured specifically to electrically couple the exposed or dead conductive pieces and the PV module. The conductive clamp may function to both the secure the PV module atop the mounting unit and to electrically ground or couple the exposed or dead conductive pieces.

Figure 12A:
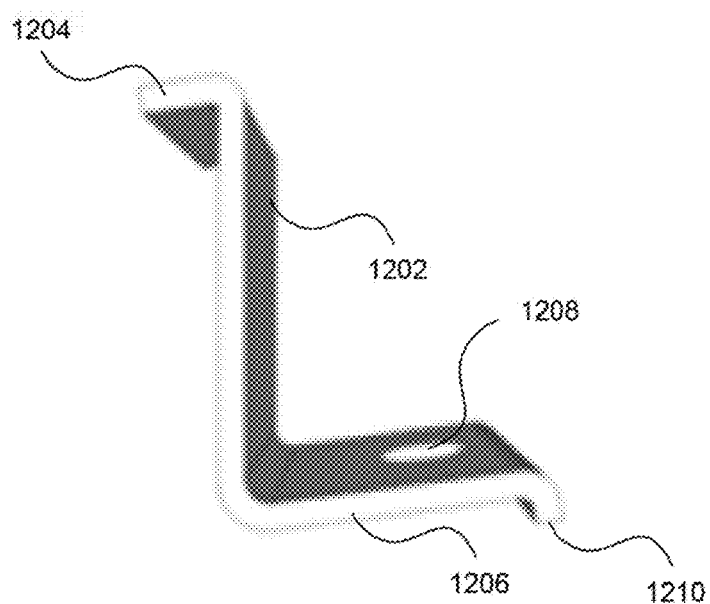
FIGS. 12A and 12B illustrate a conductive clamp that may be used to electrically couple conductive pieces of a mounting unit with a solar panel according to an embodiment of the invention.
Figure 12B:
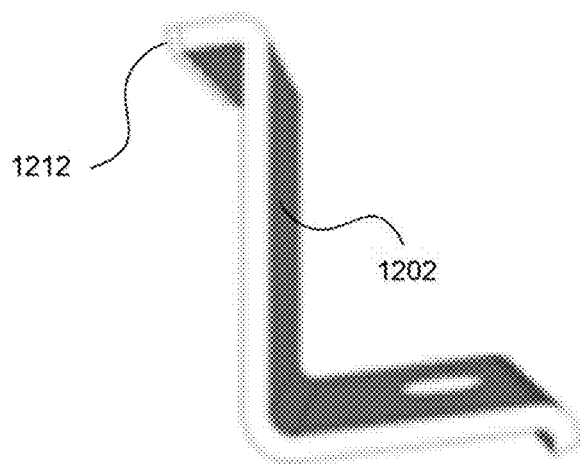

FIGS. 12A and 12B illustrate a conductive clamp that may be used to electrically couple exposed or dead conductive pieces with a PV module. The clamp of FIGS. 12A and 12B may be particularly useful for electrically coupling a coupling component (e.g., insert 152) with the PV module and may be useful for mounting the PV module. The clamp of FIGS. 12A and 12B may function similar to the mounting hardware 172 described in FIGS. 6A and 6B that couples with fastener 160 to secure a solar panel 170 to the mounting unit 100. The clamp includes a clamp body 1202 having an elongate mid-section, a first end 1206, and a second end 1204 opposite the first end. The clamp body 1202 is made of an electrically conductive material, such as aluminum, steel, stainless steel, and the like. The first end 1206 of the clamp is configured to couple with a metallic mounting rail or coupling component (e.g., insert 152—hereinafter mounting rail) of the mounting unit (not shown). In coupling with the mounting rail (not shown), the first end 1206 is configured to contact exposed metal of the mounting rail to establish electrical bonding between the clamp body 1202 and the mounting rail. The second end 1204 is configured to couple with a PV module or solar panel (hereinafter solar panel) that is positioned atop the mounting unit. The second end 1204 is coupled with the solar panel so that the second end 1204 electrically contacts the solar panel and thereby establishes electrical bonding between the mounting rail and the solar panel.

The first end 1206 includes a heel or raised portion 1210 that is configured to increase the clamp tension between the clamp body 1202 and the mounting rail, such as by pressing downward atop the mounting rail. In some embodiments, the heel or raised portion 1210 includes a tip, corner, and/or sharp edge that is configured to establish electrical bonding between the clamp body and mounting rail by biting or pressing into the mounting rail. The first end 1206 may also include an aperture 1208 through which a fastener of the mounting rail, such as a bolt, pin, and the like, is inserted to couple the clamp body 1202 with the mounting rail. As shown in FIG. 12B, in some embodiments, the second end 1204 also includes a bent tip or corner 1212 that is configured to pierce oxide or anodization layers on the solar panel's frame in order to establish electrical bonding between the clamp body 1202 and the solar panel. The tip or corner 1212 may pierce the solar panel's oxide or anodization layers as the clamp body 1202 is secured to the mounting rail, such as via aperture 1208.

In some embodiments, the mounting unit may not include exposed or dead conductive pieces, such as when a majority or all of the mounting unit's components are made of plastic. In such embodiments, the clamp of FIGS. 12A and 12B may be made or reinforced plastic. Producing the clamps from reinforced plastics eliminates the need to ground exposed metal parts.

According to an embodiment, a method of electrically coupling a solar panel with one or more components of a solar panel mounting unit includes providing a solar panel and providing a mounting unit. The mounting unit may include a metallic mounting rail that is configured for coupling with the solar panel. The method also includes positioning the solar panel atop the mounting unit and providing a clamp having an elongate mid-section, a first end, and a second end opposite the first end where the clamp is made of an electrically conductive material. The method further includes coupling the first end of the clamp with the metallic mounting rail of the mounting unit so that the first end contacts exposed metal of the mounting rail to establish electrical bonding between the clamp and the mounting rail. The method additionally includes coupling the second end of the clamp with the solar panel positioned atop the mounting unit so that the second end electrically contacts the solar panel and thereby establishes electrical bonding between the mounting rail and the solar panel.

Wind Deflector Members

Figure 13A:
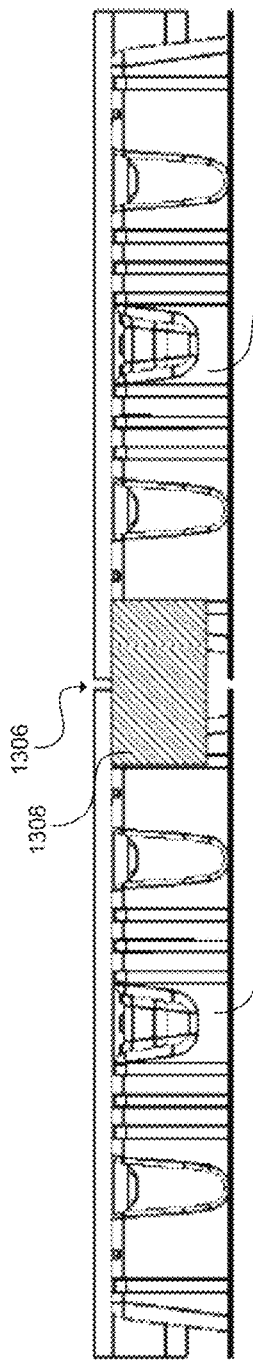
FIGS. 13A-C illustrate a coupling member that may be used to span a lateral gap between adjacent mounting units and/or reduce wind uplift forces according to an embodiment of the invention.
Figure 13B:
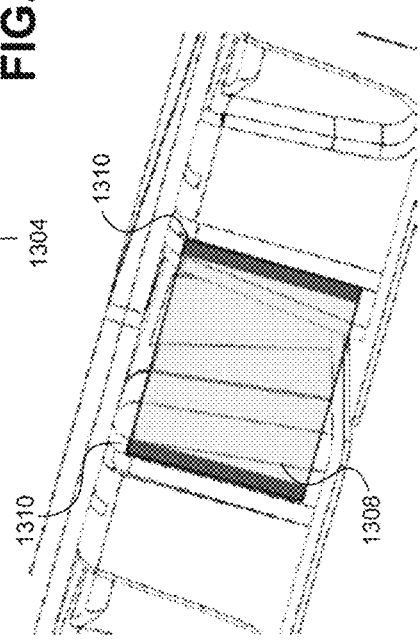
Figure 13C:
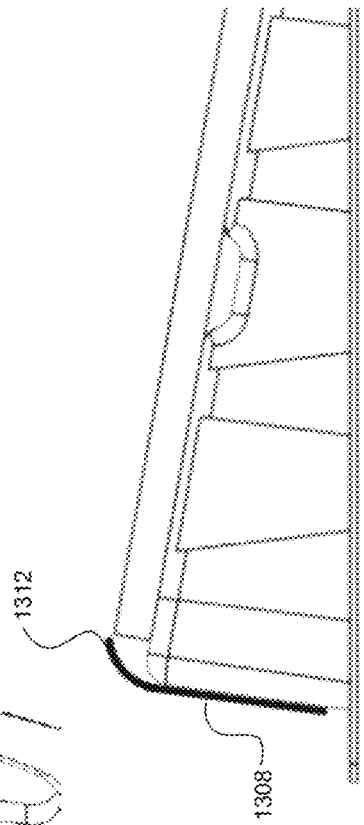

In some embodiments it may be desired to couple adjacent units with a member that spans a lateral gap between the units. The coupling member may function to deflect wind for various purposes, such as to reduce wind uplift forces. FIGS. 13A-13C illustrate various embodiments of a coupling member that may be used to span a lateral gap between adjacent mounting units and/or reduce wind uplift forces. As shown in FIG. 13A, a coupling unit 1308 is coupled with a first mounting unit 1302 and a second mounting unit 1304 between a lateral gap 1306 between the units. The coupling member 1308 is a rectangular object that is positionable to span the gap 1306 between the two units. The coupling member 1308 may be made of various materials including, in a specific embodiment, the same material as the mounting units themselves. In other embodiments, the coupling component 1308 may be made of metal, metal alloy, plastic, plastic composite, wood, or other suitably durable material. To couple the coupling member 1308 with the two units, opposing edges of the coupling member 1308 may be inserted within slots 1310 of the respective mounting units, 1302 and 1304. The opposing edges of the coupling member 1308 (e.g., snap flanged) may snap into engagement within the slots 1310 of the adjacent mounting units. In other embodiments, the coupling component 1308 may be secured to the rear wall of adjacent mounting units by mechanical fastener(s), adhesive, tape, heat welding, and the like.

When coupled with the mounting units, the coupling member 1308 may be angled with respect to the roof surface at roughly the same angle as a rear vertical surface of the mounting units, 1302 and 1304. The angled orientation of the coupling member 1308 may aid in deflecting wind up and around the attached PV module. To further deflect wind up and around the attached PV module, the coupling member 1308 may include an arcuate end portion 1312 that is positioned adjacent or slightly above a top surface of the PV module as shown in FIG. 13C. The arcuate end portion 1312 may minimize the wind that is able to access the undersurface of the PV module by directing wind over the top surface of the PV module, which may reduce wind uplift forces. The attached coupling component 1308 may further aid in reducing or preventing the accumulation of debris between the adjacent mounting units, 1302 and 1304, and/or under the attached PV module. As shown in FIG. 13C, the coupling component 1308 is normally attached to the rear surface of the adjacent mounting units. In some embodiments, the coupling component may include geometric features (not shown) such as ribs, channels, and the like, to increase the flexural stiffness of the component 1308. I In some embodiments, a bottom edge of the coupling component 1308 may be positioned so as to be raised above the roof structure by between 0.125 inches and 6 inches, and more commonly about 2 inches. The top of the coupling component 1308 may be positioned to be below the bottom of the solar panel by between 0 and 6 inches, except in instances where the top of the coupling component 1308 is positioned to extend above the top of the PV module as shown in FIG. 13C.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of attaching a solar panel mounting unit to a roof comprising:
    providing a solar panel mounting unit having:
        a base that includes a first flange and a second flange that extend laterally from the base;
        a mounting surface positioned above the base via walls that connect the mounting surface and the base, the mounting surface being couplable with a solar panel to elevate the solar panel above a surface of the roof and angle the solar panel relative thereto;
        a flexible membrane coupled with the first flange of the base and extending laterally therefrom; and
        an adhesive or tape applied to an underside of the second flange, the second flange being free of the flexible membrane material, wherein the adhesive or tape does not extend laterally beyond an edge of the second flange;
    coupling the flexible membrane material with the roof to secure the solar panel mounting unit to the roof; and
    adhesively bonding the adhesive or tape with the roof to additionally secure the mounting unit to the roof.

2. The method of claim 1, further comprising:
    coupling the flexible membrane material with only the first flange of the base; and
    applying the adhesive or tape with an underside of at least one other flange of the base other than the second flange.

3. The method of claim 2, wherein the first flange is positioned near a rear side of the base.

4. The method of claim 2, further comprising forming a gap in at least one portion or segment of the adhesive or tape.

5. The method of claim 4, wherein the second flange is positioned near a front side of the base and wherein the adhesive or tape is applied to a third and fourth flange that are positioned on opposing sides of the base between the front side and a rear side, and wherein the method further comprises forming two gaps in the adhesive or tape near the third and fourth flanges.

6. The method of claim 2, wherein the base includes a third flange and a fourth flange that are positioned between the first flange and the second flange, and wherein the method further comprises:
    attaching the flexible membrane material to only the first flange; and
    applying the adhesive or tape to an underside of the second flange, the third flange, and the fourth flange such that the second flange, third flange, and fourth flange are free of the flexible membrane material.

7. The method of claim 1, further comprising:
    heat welding the flexible membrane material to the roof; and
    removing a film from the adhesive or tape prior to adhesively bonding the adhesive or tape with the roof, the film preventing or limiting degradation of an adhesive material.

8. The method of claim 1, wherein coupling the flexible membrane material with the roof comprises bonding the flexible membrane material to the roof with an adhesive or tape, and wherein the method further comprises removing a film from the adhesive or tape prior to bonding the adhesive or tape with the roof, the film preventing or limiting degradation of the adhesive material.

9. The method of claim 1, further comprising aligning a plurality of mounting units atop a roof by:
    coupling a flexible membrane material of a first mounting unit with the roof;
    positioning a front flange of a second mounting unit atop the flexible membrane of the first mounting unit; and
    adhesively bonding, via the adhesive or tape, the front flange of the second mounting unit with the flexible membrane of the first mounting unit.

10. The method of claim 1, further comprising laterally spacing a plurality of mounting units atop the roof by:
    providing a spacing jig comprising:
        a first longitudinal section;
        a first flange member that extends from a proximal end of the first longitudinal section;
        a second longitudinal section telescopingly disposed within the first longitudinal section; and
        a second flange member that extends from a distal end of the second longitudinal section;
    positioning a first mounting unit atop the roof;
    positioning a second mounting unit atop the roof;
    positioning the first flange member of the spacing jig within a slot of the mounting surface of the first mounting unit; and
    positioning the second flange member of the spacing jig within a slot of the mounting surface of the second mounting unit, wherein said positioning of said first and second flange members within said respective slots spaces said first and second mounting units.

11. The method of claim 1, further comprising longitudinally spacing a plurality of mounting units atop the roof by:
    providing a spacing jig comprising:
        a first longitudinal section;
        a first flange member that is pivotally attached to a proximal end of the first longitudinal section;
        a second longitudinal section coupled with the first longitudinal section so as to have an angled orientation relative thereto; and
        a second flange member that extends from a distal end of the second longitudinal section;
    positioning a first mounting unit atop the roof;
    positioning a second mounting unit atop the roof;
    positioning the first flange member of the spacing jig within a slot of the mounting surface of the first mounting unit; and
    positioning the second flange member of the spacing jig within a slot of the mounting surface of the second mounting unit, wherein said positioning of said first and second flange members within said respective slots spaces said first and second mounting units.

12. A method of attaching a solar panel mounting unit to a roof comprising:
> providing a solar panel mounting unit having:
>> a base that includes a rear flange and a front flange that extend laterally from the base;
>> a mounting surface positioned above the base via walls that connect the mounting surface and the base, the mounting surface being couplable with a solar panel to elevate the solar panel above a surface of the roof and angle the solar panel relative thereto;
>> a flexible membrane coupled with the rear flange of the base and extending laterally therefrom; and
>> an adhesive or tape applied to an underside of the front flange, the front flange being free of the flexible membrane material;
> coupling the flexible membrane material with the roof to secure the solar panel mounting unit to the roof, the solar panel mounting unit being secured to the roof so that the solar panel mounting unit is pivotable about the coupled flexible membrane; and
> subsequent to coupling the flexible membrane material with the roof, adhesively bonding the adhesive or tape with the roof to additionally secure the solar panel mounting unit to the roof.

13. The method of claim 12, further comprising:
coupling the flexible membrane material with only the rear flange of the base; and
applying the adhesive or tape with an underside of at least one other flange of the base other than the front flange.

14. The method of claim 13, further comprising forming a gap in at least one portion or segment of the adhesive or tape.

15. The method of claim 14, wherein the adhesive or tape is applied to a first side flange and a second side flange that are positioned between the rear flange and the front flange, and wherein the method further comprises forming two gaps in the adhesive or tape near the first side flange and the second side flange, respectively.

16. The method of claim 13, wherein the base includes a first side flange and a second side flange that are positioned between the rear flange and the front flange, and wherein the method further comprises:
attaching the flexible membrane material to the rear flange only; and
applying the adhesive or tape to an underside of the front flange, the first side flange, and the second side flange, wherein the front flange, first side flange, and second side flange are free of the flexible membrane material.

17. The method of claim 12, further comprising:
heat welding the flexible membrane material to the roof; and
removing a film from the adhesive or tape prior to adhesively bonding the adhesive or tape with the roof, the film preventing or limiting degradation of an adhesive material.

18. The method of claim 12, wherein coupling the flexible membrane material with the roof comprises bonding the flexible membrane material to the roof with an adhesive or tape, and wherein the method further comprises removing a film from the adhesive or tape prior to bonding the adhesive or tape with the roof, the film preventing or limiting degradation of the adhesive material.

19. The method of claim 12, further comprising aligning a plurality of mounting units atop a roof by:
coupling a flexible membrane material of a first mounting unit with the roof;
positioning a front flange of a second mounting unit atop the flexible membrane of the first mounting unit; and
adhesively bonding, via the adhesive or tape, the front flange of the second mounting unit with the flexible membrane of the first mounting unit.

20. The method of claim 12, further comprising laterally spacing a plurality of mounting units atop the roof by:
providing a spacing jig comprising:
a first longitudinal section;
a first flange member that extends from a proximal end of the first longitudinal section;
a second longitudinal section telescopingly disposed within the first longitudinal section; and
a second flange member that extends from a distal end of the second longitudinal section;
positioning a first mounting unit atop the roof;
positioning a second mounting unit atop the roof;
positioning the first flange member of the spacing jig within a slot of the mounting surface of the first mounting unit; and
positioning the second flange member of the spacing jig within a slot of the mounting surface of the second mounting unit, wherein said positioning of said first and second flange members within said respective slots spaces said first and second mounting units.

21. The method of claim 12, further comprising longitudinally spacing a plurality of mounting units atop the roof by:
providing a spacing jig comprising:
a first longitudinal section;
a first flange member that is pivotally attached to a proximal end of the first longitudinal section;
a second longitudinal section coupled with the first longitudinal section so as to have an angled orientation relative thereto; and
a second flange member that extends from a distal end of the second longitudinal section;
positioning a first mounting unit atop the roof;
positioning a second mounting unit atop the roof;
positioning the first flange member of the spacing jig within a slot of the mounting surface of the first mounting unit; and
positioning the second flange member of the spacing jig within a slot of the mounting surface of the second mounting unit, wherein said positioning of said first and second flange members within said respective slots spaces said first and second mounting units.

* * * * *